(12) United States Patent
Benedetti et al.

(10) Patent No.: US 12,196,772 B2
(45) Date of Patent: Jan. 14, 2025

(54) METHOD AND SYSTEM TO LOCALIZE A CARRIER ON A LABORATORY TRANSPORT SYSTEM

(71) Applicant: Roche Diagnostics Operations, Inc., Indianapolis, IN (US)

(72) Inventors: Riccardo Leone Benedetti, Fehraltorf (CH); Reto Huesser, Hagendorn (CH); Goran Savatic, Cham (CH); Norbert Schmitt, Lucerne (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 1047 days.

(21) Appl. No.: 17/008,778

(22) Filed: Sep. 1, 2020

(65) Prior Publication Data

US 2021/0072270 A1 Mar. 11, 2021

(30) Foreign Application Priority Data

Sep. 5, 2019 (EP) ..................................... 19195505

(51) Int. Cl.
*H04W 4/80* (2018.01)
*G01N 35/00* (2006.01)
*G01N 35/04* (2006.01)

(52) U.S. Cl.
CPC ....... *G01N 35/04* (2013.01); *G01N 35/00732* (2013.01); *H04W 4/80* (2018.02); *G01N 2035/00831* (2013.01); *G01N 2035/0477* (2013.01); *G01N 2035/0493* (2013.01)

(58) Field of Classification Search
CPC ............. G01N 35/00732; G01N 35/04; G01N 2035/00831; G01N 2035/0477; G01N 2035/0493; H04W 4/80
See application file for complete search history.

(56) References Cited

U.S. PATENT DOCUMENTS

| 9,182,419 | B2 | 11/2015 | Hecht |
| 9,567,167 | B2 | 2/2017 | Sinz |
| 9,969,570 | B2 | 5/2018 | Heise et al. |
| 9,973,391 | B2 * | 5/2018 | Skaaksrud ............ H04W 24/10 |

(Continued)

FOREIGN PATENT DOCUMENTS

| EP | 2988134 A1 | 2/2016 |
| EP | 3070479 A1 | 9/2016 |

(Continued)

*Primary Examiner* — Saul Rodriguez
*Assistant Examiner* — Brendan P Tighe
(74) *Attorney, Agent, or Firm* — Woodard, Emhardt, Henry Reeves & Wagner, LLP

(57) ABSTRACT

A method to localize a carrier on a laboratory transport system is presented. The laboratory transport system comprises a carrier associated with an identity, a multi-lane transport module, and a control unit. The carrier comprises a signal transmitter configured to transmit a signal comprising information about the identity. The multi-lane transport module comprises a transport surface comprising a first and a second transport lane as well as a first signal receiver and a second signal receiver each configured to receive the transmitted signal. Based on received signal strengths, the control unit localizes the carrier on one of the transport lanes of the multi-lane transport module.

17 Claims, 7 Drawing Sheets

(56) References Cited

U.S. PATENT DOCUMENTS

| | | | |
|---|---|---|---|
| 2004/0134750 A1* | 7/2004 | Luoma, II | G01N 35/04 |
| | | | 198/340 |
| 2006/0000296 A1* | 1/2006 | Salter | G01N 35/00732 |
| | | | 73/864.91 |
| 2006/0193754 A1* | 8/2006 | Toyoda | G01N 35/026 |
| | | | 422/400 |
| 2009/0129990 A1* | 5/2009 | Kokawa | B01L 9/06 |
| | | | 702/82 |
| 2014/0202829 A1* | 7/2014 | Eberhardt | B65G 35/00 |
| | | | 198/339.1 |
| 2014/0373747 A1* | 12/2014 | Yagci | B61C 3/02 |
| | | | 320/108 |
| 2015/0241458 A1* | 8/2015 | Pollack | G01N 35/00732 |
| | | | 700/230 |
| 2017/0012830 A1* | 1/2017 | Skaaksrud | H04B 17/318 |
| 2017/0131307 A1 | 5/2017 | Pedain | |

FOREIGN PATENT DOCUMENTS

| | | |
|---|---|---|
| EP | 3376233 A1 | 9/2018 |
| JP | 2005 249740 | 9/2005 |
| JP | 2010 100421 | 5/2010 |
| JP | 2020 514735 | 5/2020 |

\* cited by examiner

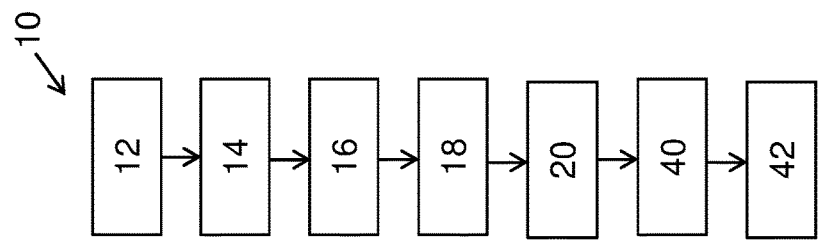
FIG. 7E
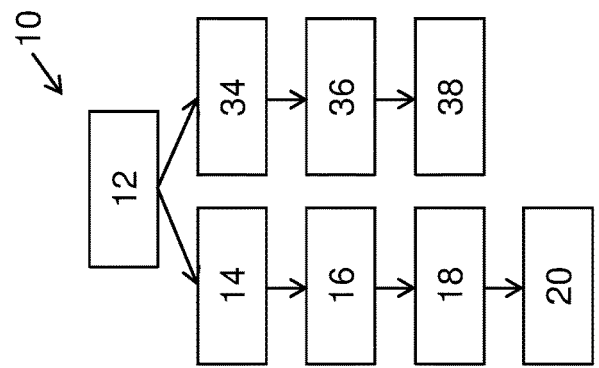
FIG. 7D
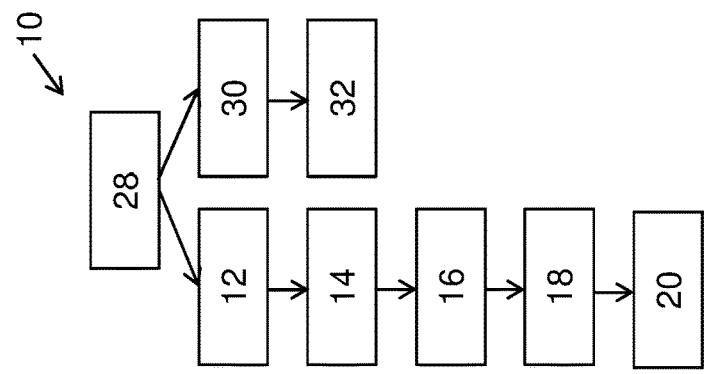
FIG. 7C
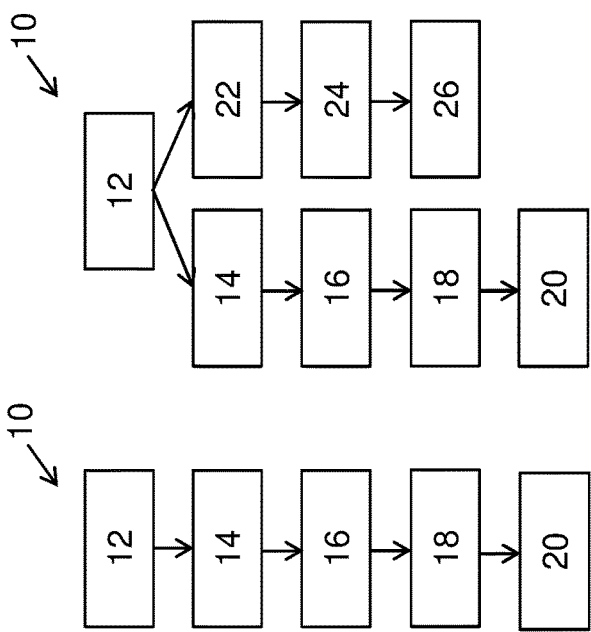
FIG. 7B
FIG. 7A

METHOD AND SYSTEM TO LOCALIZE A CARRIER ON A LABORATORY TRANSPORT SYSTEM

CROSS-REFERENCE TO RELATED APPLICATIONS

This application claims priority to EP 19195505.3, filed Sep. 5, 2019, which is hereby incorporated by reference.

BACKGROUND

The present disclosure generally relates to automated in vitro diagnostic laboratory testing and, in particular, to localizing a carrier on the laboratory transport system.

In diagnostic laboratory systems test sample vessels, test reagent containers, or test consumable containers are transported between multiple stations such as pre-analytical, analytical and post-analytical stations according to pre-defined laboratory workflows. Typically, such vessels and containers are transported in carriers. In fully-automated diagnostic laboratory systems, the carriers are moved on a transport surface of a laboratory transport system in order to distribute the vessels and containers to connected pre-analytical, analytical and post-analytical stations which can conduct different sample processing steps like preparing, analysing, or archiving of test samples.

Depending on the size and number of connected stations of a diagnostic laboratory system, the laboratory transport system of the diagnostic laboratory system may comprise one or more multi-lane transport modules connected to each other for transporting vessels and containers to multiple destinations at the same time. In order to improve throughputs, turn-around times, and test portfolios, automated diagnostic laboratory systems comprise multiple analytical stations. Accordingly, the number of transported vessels as well as the complexity of transport routes are increasing. Furthermore, the time to transport a test sample to analytical stations should not be the limiting factor in a laboratory workflow so that test results or validation results can be provided on time and with required quality for further diagnosis. Therefore, a reliable and effective identification and localization of a specific carrier on multi-lane transport modules is required for transporting the right carrier from a predefined starting position to a predefined destination on time.

Therefore, there is a need to localize carriers on a laboratory transport system in a simple, reliable and cost-efficient way, thereby better serving the needs of automated in vitro diagnostic laboratory testing.

SUMMARY

According to the present disclosure, a method to localize a carrier on a laboratory transport system is presented. The laboratory transport system can comprise a carrier associated with an identity, a multi-lane transport module, and a control unit. The carrier can be configured to move on the multi-lane transport module. The carrier can comprise a signal transmitter configured to transmit a signal comprising information about the identity. The multi-lane transport module can comprise a transport surface comprising a first and a second transport lane each configured to transport the carrier. The multi-lane transport module can comprise a first signal receiver and a second signal receiver each configured to receive the transmitted signal. The multi-lane transport module can be communicatively connected to the control unit. The method can comprise a) receiving, by the first signal receiver, a first signal strength of the transmitted signal and receiving, by the second signal receiver, a second signal strength of transmitted signal at the same time, b) transmitting, by the first signal receiver, the first signal strength to the control unit and transmitting, by the second signal receiver, the second signal strength to the control unit, c) calculating, by the control unit, a signal strength difference or signal strength ratio based on the first signal strength and second signal strength, d) comparing, by the control unit, the calculated signal strength difference or signal strength ratio with one or more threshold values, and e) localizing, by the control unit, the carrier associated with the identity on one transport lane of the first and second transport lane based on the comparison between the calculated signal strength difference or signal strength ratio and the one or more threshold values.

In accordance with one embodiment of the present disclosure, a laboratory transport system comprising a carrier associated with an identity, a multi-lane transport module, and a control unit is presented. The carrier can be configured to move on the multi-lane transport module. The carrier can comprise a signal transmitter configured to transmit a signal comprising information about the identity. The multi-lane transport module can comprise a transport surface comprising a first and a second transport lane each configured to transport the carrier. The multi-lane transport module can comprise a first signal receiver and a second signal receiver each configured to receive the transmitted signal. The multi-lane transport module can be communicatively connected to the control unit. The laboratory transport system can be configured to execute the steps a) to h) of the above method to localize a carrier on the laboratory transport system.

In accordance with another embodiment of the present disclosure, a computer program product comprising instructions to cause the laboratory transport system as described above to execute the steps of the method to localize a carrier on the laboratory transport system as described above is presented.

In accordance with yet another embodiment of the present disclosure, computer-readable storage medium having stored thereon the computer program comprising instructions to cause the laboratory transport system as described above to execute the steps of the method to localize a carrier on the laboratory transport system as described above is presented.

Accordingly, it is a feature of the embodiments of the present disclosure to localize carriers on a laboratory transport system in a simple, reliable and cost-efficient way, thereby better serving the needs of automated in vitro diagnostic laboratory testing. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 7A-E illustrate flowcharts of the method to localize a carrier on a laboratory transport system and of the method to localize a carrier on a laboratory transport system and to determine the velocity and motion direction of the carrier according to an embodiment of the present disclosure.

DETAILED DESCRIPTION

Figure 1:
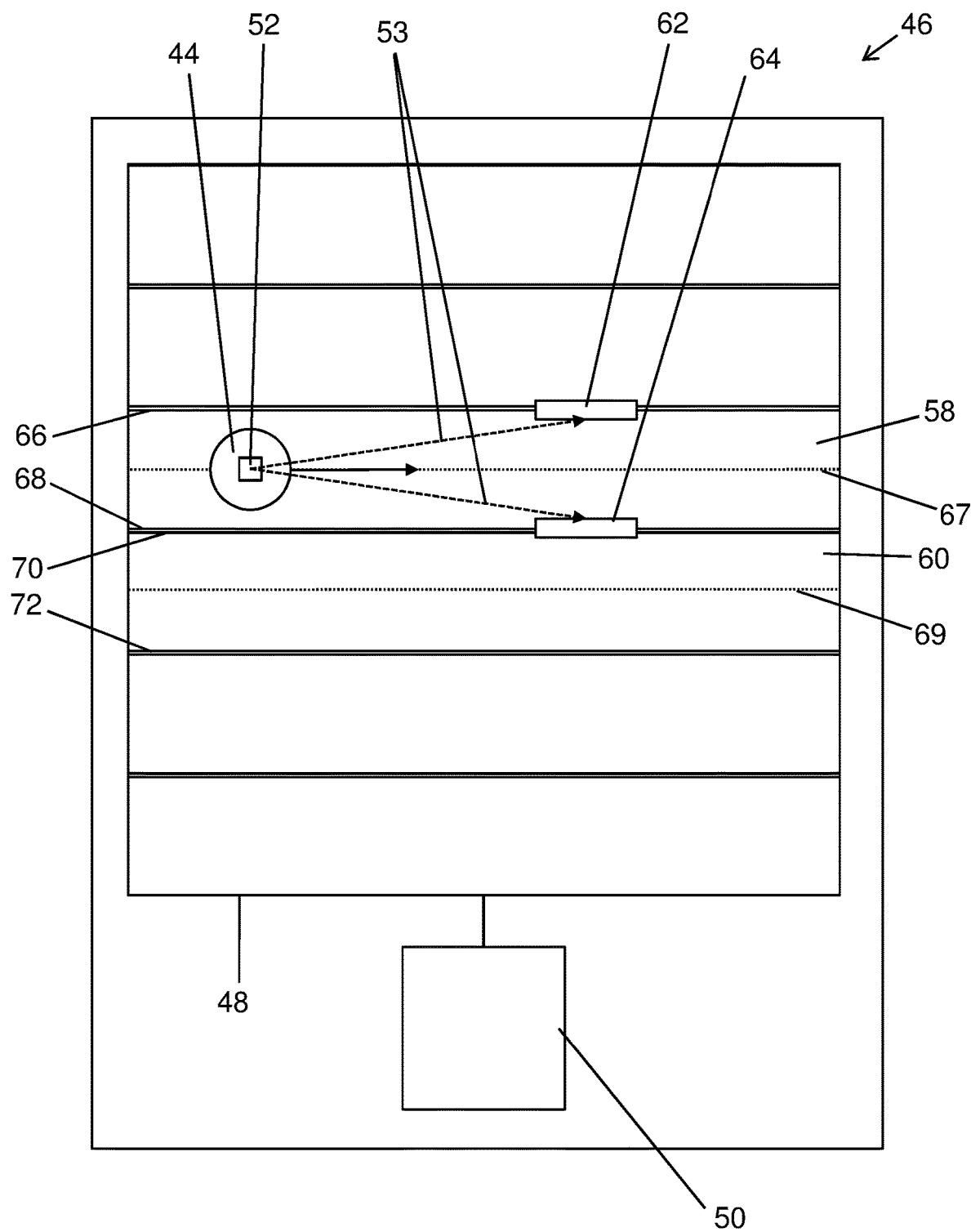
FIG. 1 illustrates a schematic representation of a laboratory transport system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A method to localize a carrier on a laboratory transport system is disclosed. The laboratory transport system can comprise a carrier associated with an identity, a multi-lane transport module, and a control unit. The carrier can be configured to move on the multi-lane transport module. The carrier can comprise a signal transmitter configured to transmit a signal comprising information about the identity. The multi-lane transport module can comprise a transport surface comprising a first and a second transport lane each configured to transport the carrier. The multi-lane transport module can comprise a first signal receiver and a second signal receiver each configured to receive the transmitted signal. The multi-lane transport module can comprise communicatively connected to the control unit.

The method can comprise a) receiving, by the first signal receiver, a first signal strength of the transmitted signal and receiving, by the second signal receiver, a second signal strength of transmitted signal at the same time, b) transmitting, by the first signal receiver, the first signal strength to the control unit and transmitting, by the second signal receiver, the second signal strength to the control unit, c) calculating, by the control unit, a signal strength difference or signal strength ratio based on the first signal strength and second signal strength, d) comparing, by the control unit, the calculated signal strength difference or signal strength ratio with one or more threshold values, and e) localizing, by the control unit, the carrier associated with the identity on one transport lane of the first and second transport lane based on the comparison between the calculated signal strength difference or signal strength ratio and the one or more threshold values.

As used herein, the term "laboratory transport system" can relate to a system designed to transport or distribute payloads such as test sample vessels, test reagent containers, or test consumable containers to connected pre-analytical stations, analytical stations, or post-analytical stations of a diagnostic laboratory system. A test sample vessel can be configured for receiving, holding, transporting, and/or releasing a test sample or a mixture of a test sample and test reagent, a test reagent container can be configured for receiving, holding, transporting, and/or releasing a test reagent, and a test consumable containers can be configured for receiving, holding, transporting, and/or releasing a test consumable such as, as non-limiting example, pipetting tips.

A pre-analytical station can usually be used for the preliminary processing of test samples or test sample vessels. An analytical station can be designed, for example, to use a test sample or part of the test sample and a test reagent in order to produce a measurable signal, on the basis of which it can be possible to determine whether an analyte is present, and if desired in what concentration. A post-analytical station can usually be used for the post-processing of test samples or test sample vessels like the archiving of test samples or test sample vessels. The pre-analytical, analytical and post-analytical station may comprise, for example, at least one device from the group of following devices: a sorting device for sorting test sample vessels, a cap removal device for removing caps or closures on test sample vessels, a cap fitting device for fitting caps or closures on test sample vessels, a cap removal/fitting device for removing/fitting caps or closures on test sample vessels, a pipetting device for pipetting test samples, an aliquoting device for aliquoting test samples, a centrifuging device for centrifuging test samples, an analyzing device for analyzing test samples, a heating device for heating test samples, a cooling device for cooling test samples, a mixing device for mixing test samples, a separation device for isolating analytes of test samples, a storing device for storing test samples, an archiving device for archiving test samples, a test sample vessel type determination device for determining test sample vessel types, a test sample quality determination device for determining test sample qualities, a test sample vessel identification device for identifying test sample vessels. Such pre-analytical stations, analytical stations, post-analytical stations, and devices are well known in the art.

The laboratory transport system can comprise a multi-lane transport module comprising a transport surface on which carriers loaded with test sample vessels, test reagent containers, or test consumable containers can be transported. As used herein, the term "multi-lane transport module" can relate to a device comprising a transport surface with two or more transport lanes. A transport lane can define a transport route or path on the transport surface on which a carrier can be transported in a direction actively or passively. In one embodiment, the transport surface can comprise six transport lanes.

In one embodiment, the multi-lane transport module can comprise a number of electro-magnetic actuators stationary arranged below the transport surface and configured to generate magnetic fields to move the carrier on the transport surface. Such a multi-lane transport module is well known in the art and may be designed as described in EP2566787B1, which is hereby incorporated by reference. In another embodiment, the multi-lane transport module can comprise a transport surface comprising one or more conveyor belts to move and stop the carrier on the transport surface. Such a conveyor belt is well known in the art. In a further embodiment, the multi-lane transport module can comprise a stable transport surface on which a self-propelled carrier can move. In a further embodiment, the multi-lane transport module can comprise a transport surface comprising one or more rails on which a carrier can be moved. In another embodiment, the multi-lane transport module can comprise a number of launch devices configured to impart a force on the carrier so that the carrier can move in a predefined direction for a predefined distance on the transport surface without further application of force.

The multi-lane transport module can further comprise a first signal receiver and a second signal receiver, each configured to receive a transmitted signal from a carrier associated with an identity. Depending on the number of transport lanes, the multi-lane transport module may comprise two or more signal receivers. For example, if the multi-lane transport module comprises six transport lanes, the multi-lane transport module may comprise two, three, four, five, six, or seven signal receivers. As used herein, the term "signal receiver" can relate to an electric device configured to receive a signal in form of electromagnetic waves and converts data or information carried by the electromagnetic waves to a useable form such as, for example, a human or machine readable identity number associated with the carrier. The received signal strength can depend on the distance between the signal transmitter and signal receiver. The closer the carrier is to the signal receiver, the stronger the received signal strength. The first signal receiver can receive a first signal strength of the transmitted signal and the second signal receiver can receive a second signal strength of transmitted signal at the same time. Depending on the relative position of the carrier to the first and second signal receiver, the first and second signal strengths can be the same or different. In one embodiment, the signal receivers can be positioned on top of the transport surface. For example, the signal receivers may be mounted on the transport surface. In one embodiment, the signal receivers can be positioned above the transport surface. For example, the signal receivers may be mounted on a frame located above the transport surface so that the signal receivers are not in direct contact with the transport surface. In an alternative embodiment, the signal receivers can be integrated in the transport surface of the multi-lane transport module so that the transport surface itself and/or areas above the transport surface may be designed free of any signal receivers. For example, the transport surface may comprise covered recesses in which the signal receivers may be mounted. In a further alternative embodiment, the signal receivers can be positioned below the transport surface. For example, the signal receivers may be mounted on a frame located below the transport surface.

In one embodiment, the signal receivers can be RFID-reader antennas (radio-frequency identification reader antennas). The RFID-reader antennas can be configured to receive a signal transmitted from a RFID tag (radio-frequency identification tag).

As used herein, the term "carrier" can relate to a device configured for receiving, holding, transporting, and/or releasing a test sample vessel, test reagent container, or test consumable container. For transporting a test sample vessel, test reagent container, or test consumable container on a laboratory transport system, the test sample vessel, test reagent container, or test consumable container can be inserted into a holder of the carrier.

In one embodiment, the carrier can comprise at least one magnetically active device, which can interact with a magnetic field so that a magnetic force can be applied to carrier. A carrier comprising at least one magnetically active device, which can interact with a magnetic field is well known in the art and may be designed as described in EP2988134A1 or as described in EP3070479A1, both of which are hereby incorporated by reference. In another embodiment, the carrier can comprise motor-driven wheels. A carrier comprising motor-driven wheels is well known in the art and may be designed as described in U.S. Pat. No. 9,182,419B2, which is hereby incorporated by reference.

The carrier can be associated with an identity. As used herein, the term "identity" can relate to an identifier for the distinct identification of each carrier and/or its payload. Thus, the identity may depend on the payload of the carrier. In one embodiment, the identity can relate to an identity of a test sample if the carrier holds a test sample vessel containing the test sample. In another embodiment, the identity can relate to an identity of a control sample if the carrier holds a control sample vessel containing the control sample. In a further embodiment, the identity can relate to an identity of a test reagent if the carrier holds a test reagent container containing the test reagent. In a further embodiment, the identity can relate to an identity of a consumable if the carrier holds a consumable container containing the consumable. The identity may be associated with attributes of the specific payload such as, as non-limiting examples, payload type, payload expiration date, payload volume, payload weight, payload onboard stability time, payload aliquot identity, test orders associated with the payload, and the like. In an alternative embodiment, the identity can be a carrier identity if the carrier does not hold a test sample vessel containing a test sample. The identity can also be a carrier identity if the carrier does not hold any other payload such as a control sample vessel containing a control sample, a test reagent container containing a test reagent, or consumable container containing a consumable. The carrier identity may be associated with attributes of the carrier such as, as non-limiting examples, carrier type, carrier dimension and/or geometric form, carrier onboard time, and the like.

The carrier can comprise a signal transmitter configured to transmit a signal comprising information about the identity. As used herein, the term "signal transmitter" can relate to any passive or active electric device used to produce a signal based on electromagnetic waves in order to transmit or send data or information about the identity (e.g., an identity number and/or associated attributes). In one embodiment, the signal transmitter can be an RFID (radio-frequency identification) tag. The RFID tag may be either an active or a passive RFID tag. Information about the identity and/or associated attributes relating to the payload of the carrier and/or carrier may be written directly on the RFID tag. For example, the identity of a test sample and test sample type (e.g., serum, plasma, whole blood, urine, stool, sputum, cerebrospinal fluid, bone marrow, and the like) may be written directly on the RFID tag if the carrier holds a test sample vessel containing the test sample. Alternatively, the RFID tag can comprise a carrier identity, which can be linked with a test sample identity and/or associated attributes in a database if the carrier holds a test sample vessel containing the test sample. In a specific embodiment, the transmitted signal can be received independent of the orientation of the RFID tag. In another embodiment, the RFID tag can comprise a multi-port antenna. In an alternative embodiment, the RFID tag can comprise a ring shaped antenna arranged in the carrier.

The term "control unit" as used herein can encompass any physical or virtual processing device comprising a processor, which can be configured to control the laboratory transport system in a way that carriers can be localized and transported on the laboratory transport system. For example, a carrier associated with an identity may need to be transported from a predefined starting position (e.g., connected pre-analytical station or connected analytical station) to a predefined destination (e.g., another connected analytical station or connected post-analytical station). Thus, the control unit may receive information from a management unit regarding the carrier and/or its payload, which may need to be transported from a predefined starting position to a predefined destination. The control unit can control the laboratory transport system to transport the carrier from the predefined starting position to a predefined destination based on the position or localization of the carrier on the laboratory transport system. The processor of the control unit may control the transport of a carrier associated with an identity on the laboratory transport system by localizing the carrier on a multi-lane transport module of the laboratory transport system as further described herein. The processor of the control unit may, for instance, be embodied as a programmable logic controller configured to execute a computer-readable program stored on a computer-readable storage medium provided with instructions to cause the laboratory transport system as described herein to execute the method to localize and transport a carrier on the laboratory transport system. The control unit may further comprise a user interface for displaying and/or entering information regarding carriers and/or corresponding payloads, which have to be localized and transported on the laboratory transport system.

In one embodiment of the method, in c), the signal strength difference can be calculated by subtracting the second signal strength from the first signal strength or the signal strength ratio can be calculated by dividing the first signal strength by the second signal strength. Alternatively, the signal strength difference may be calculated by subtracting the first signal strength from the second signal strength or the signal strength ratio can be calculated by dividing the second signal strength by the first signal strength.

In one embodiment, the first and second signal strength for calculation can be unprocessed signal strengths or signal strengths processed by the control unit. As used herein, the term "unprocessed signal strength" can mean a signal strength as received by a signal receiver without further processing. The unprocessed signal strength may be used directly for calculating the signal strength difference or signal strength ratio. However, depending on the setup of the multi-lane transport module such as, for example, the number of signal receivers and/or the number of transport lanes of the multi-lane transport module, received signal strengths may be processed by the control unit before calculating the signal strength difference or signal strength ratio. For example, only a signal strength, which fulfills a predefined criterion such as, as non-limiting example, a predefined signal strength level or signal strength threshold, can be used for calculation. Alternatively, a noise signal can be subtracted from the received signal strength before calculation. Furthermore, received signal strengths may be converted or transformed by any mathematical methods to a certain signal strength index proportional to the received signal strength, which can then be used for calculation.

In one embodiment, the method can further comprise after b) comparing, by the control unit, the transmitted first signal strength with a first predefined signal strength threshold and comparing, by the control unit, the transmitted second signal strength with a second predefined signal strength threshold, executing c) to e) of the method, by the control unit, if the first signal strength is above the first signal strength threshold and the second signal strength is above the second signal strength threshold, or controlling, by the control unit, the laboratory transport system to transport subsequent carriers which enter the multi-lane transport module on a predefined transport lane of the first and second transport lane if the first signal strength is below the first signal strength threshold or the second signal strength is below the second signal strength threshold.

Thus, the control unit may detect a failure or error of the first or second signal receiver if the first or second signal receiver transmits a signal strength to the control unit, which is below a first or second predefined signal strength threshold or if the first or second signal receiver does not transmit any signal strength to the control unit. If a failure of the first or second signal receiver was detected, the control unit may not execute c) to e) of the method for the carrier. The control unit may control the laboratory transport system to stop the carrier for which the localization cannot be determined and may display a notification comprising information about the carrier on a user interface of the control unit or send a notification comprising information about the carrier to an operator, e.g., via email or short message service. Alternatively, in cases where the transport lanes comprise further sensors to sense the carrier on a transport lane, the control unit may sense the carrier on one of the transport lanes and may control the laboratory transport system to transport the carrier on the predefined transport lane of the first and second transport lane. In order to transport subsequent carriers, which enter the multi-lane transport module, the control unit can control the laboratory transport system to transport subsequent carriers on a predefined transport lane. Thus, in cases where the localization of a carrier on one of the two transport lanes is not assured due to a failure or error of one signal receiver the localization of the carrier can be assured by transporting the carrier on a predefined transport lane until the erroneous signal receiver can be replaced or repaired. In one embodiment, the predefined transport lane can be determined based on the position of the still functioning signal receiver. For example, the predefined transport lane may comprise a lane side or centerline on which the still functioning signal receiver may be positioned. In a further embodiment, if a failure of the first or second signal receiver was detected, the control unit can display a notification comprising information about the erroneous signal receiver on a user interface of the control unit. Alternatively, if a failure of the first or second signal receiver was detected, the control unit may send a notification comprising information about the erroneous signal receiver to an operator, e.g., via email or short message service.

In one embodiment, the first and second transport lane can be straight and substantially parallel to each other. Each of the first and second transport lane can comprise a first lane side, a second lane side, and a centerline. The first signal receiver can be positioned at one lane side and the second signal receiver can be positioned at another lane side or the first signal receiver can be positioned at one centerline and the second signal receiver can be positioned at the other centerline. The first signal receiver and the second signal receiver can be facing each other. The first and the second lane side can define the width of a transport lane on which the carrier can be transported in a defined transport direction. The centerline of a transport lane can be located between the first and second lane side, wherein the distance between the centerline and the first lane side and the distance between the centerline and the second lane side can be the same. The transport direction of the first transport lane and the transport direction of the second transport lane may be the same or different. The transport direction of the first transport lane or the transport direction of the second transport lane may change from one direction to the opposite direction. If the first and the second transport lane are directly adjacent to each other, the first or the second lane side of the first transport lane may overlap with the first or the second lane side of the second lane transport lane. Alternatively, the first and second transport lanes can be separated by a gap and none of the lane sides overlap. In one embodiment, one or more straight and substantially parallel transport lanes may be in between and/or adjacent to the first and second transport lane forming a multi-lane transport module comprising more than two transport lanes.

In one embodiment, the second lane side of the first transport lane can be closer to the second transport lane than the first lane side of the first transport lane. The first signal receiver can be positioned at the first lane side of the first transport lane and the second receiver can be positioned at the second lane side of the first transport lane. Additionally, in e) of the method, the carrier associated with the identity can be localized on the first transport lane if the signal strength difference or signal strength ratio is between two threshold values. For example, if the carrier is in the middle of the first transport lane, the distance between the carrier and the first signal receiver and the distance between the carrier and the second signal receiver can be the same. As the signal strength depends on the distance between the carrier and the signal receivers, the first signal strength (S1) and the second signal strength (S2) can be the same. Accordingly, the signal strength difference (S1−S2) can be zero or the signal strength ratio (S1/S2) can be one. If the carrier is not exactly in the middle of the first transport lane but still within the first and second lane side of the first transport line, the signal strength difference (S1−S2) can be between two threshold values around 0 (e.g. S1−S2<0+X and S1−S2>0−X, wherein 0+X and 0−X are the two threshold values) and the signal strength ratio can be between two threshold values around 1 (e.g. S1/S2<1+Y and S1/S2>1−Z, wherein 1+Y and 1−Z are the two threshold values). If the carrier is outside the first and second lane side of the first transport lane (e.g., on transport lane(s) adjacent to the first transport lane like the second transport lane), the signal strength difference can be above or below the two threshold values around 0 (e.g. S1−S2>0+X or S1−S2<0−X, wherein 0+X and 0−X are the two threshold values) and the signal strength ratio can be above or below the two threshold values around 1 (e.g. S1/S2>1+Y or S1/S2<1−Z, wherein 1+Y and 1−Z are the two threshold values). In one embodiment, the signal receivers can be positioned on top or above the transport surface forming a gate. In an alternative embodiment, the signal receivers can be integrated in the transport surface of the multi-lane transport module so that the transport surface itself and/or areas above the transport surface may be designed free of any signal receivers. In a further embodiment, the signal receivers can be positioned below the transport surface.

In another embodiment, the second lane side of the first transport lane can be closer to the second transport lane than the first lane side of the first transport lane. In addition, the first lane side of the second transport lane can be closer to the first transport lane than the second lane side of the second transport lane. The first signal receiver can be positioned at the first lane side of the first transport lane and the second receiver can be positioned at the second lane side of the second transport lane. Moreover, in e) of the method, the carrier associated with the identity can be localized on the first transport lane if the signal strength difference or signal strength ratio is bigger than one threshold value. For example, if the carrier is on the first transport lane, the distance between the carrier and the first signal receiver can be shorter than the distance between the carrier and the second signal receiver. As the signal strength depends on the distance between the carrier and the signal receivers, the first signal strength (S1) can be bigger than the second signal strength (S2). Accordingly, the signal strength difference (S1−S2) can be bigger than zero or the signal strength ratio (S1/S2) can be bigger than one. If the carrier is on the second transport lane, the distance between the carrier and the first signal receiver can be longer than the distance between the carrier and the second signal receiver. Additionally, the first signal strength (S1) can be smaller than the second signal strength (S2). Accordingly, the signal strength difference (S1−S2) can be smaller than zero or the signal strength ratio (S1/S2) can be smaller than one. In one embodiment, the signal receivers can be positioned on top or above the transport surface forming a gate. In an alternative embodiment, the signal receivers can be integrated in the transport surface of the multi-lane transport module so that the transport surface itself and/or areas above the transport surface may be designed free of any signal receivers. In a further embodiment, the signal receivers can be positioned below the transport surface.

In a further embodiment, the first signal receiver can be positioned at the centerline of the first transport lane and the second signal receiver can be positioned at the centerline of the second transport lane. In addition, in e), the carrier associated with the identity can be localized on the first transport lane if the signal strength difference or signal strength ratio is bigger than one threshold value. For example, if the carrier is on the first transport lane, the distance between the carrier and the first signal receiver can be shorter than the distance between the carrier and the second signal receiver. As the signal strength depends on the distance between the carrier and the signal receivers, the first signal strength (S1) can be bigger than the second signal strength (S2). Accordingly, the signal strength difference (S1−S2) can be bigger than zero or the signal strength ratio (S1/S2) can be bigger than one. If the carrier is on the second transport lane, the distance between the carrier and the first signal receiver can be longer than the distance between the carrier and the second signal receiver. Additionally, the first signal strength (S1) can be smaller than the second signal strength (S2). Accordingly, the signal strength difference (S1−S2) can be smaller than zero or the signal strength ratio (S1/S2) can be smaller than one. In one embodiment, the signal receivers can be positioned above the transport surface. For example, the signal receivers may be mounted on a frame located above the transport surface so that the carrier can be transported under the signal receivers. In an alternative embodiment, the signal receivers can be integrated in the transport surface of the multi-lane transport module so that the transport surface itself and/or areas above the transport surface may be designed free of any signal receivers. In a further embodiment, the signal receivers can be positioned below the transport surface.

In one embodiment, the first and second transport lane can be straight, substantially perpendicular to each other, and can intersect each other at an intersection. The first transport lane can comprise a first centerline and the second transport lane can comprise a second centerline. The first signal receiver can be positioned at the first centerline at a defined distance to the intersection and the second signal receiver can be positioned at the second centerline at the defined distance to the intersection. Additionally, in e), the carrier associated with the identity can be localized on the first transport lane if the first signal strength is above a signal strength threshold and the signal strength difference or signal strength ratio can be bigger than one threshold value or if the first signal strength is below a signal strength threshold and the signal strength difference or signal strength ratio can be smaller than one threshold value. For example, the received first signal strength can be above a signal strength threshold and the distance between the carrier and the first signal receiver can be shorter than the distance between the carrier and the second signal receiver if the carrier is on the first transport lane between the first signal receiver and the intersection. As the signal strength depends on the distance between the carrier and the signal receivers, the first signal strength (S1) can be bigger than the second signal strength (S2). Accordingly, the signal strength difference (S1−S2) can be bigger than zero or the signal strength ratio (S1/S2) can be bigger than one. In addition, the received first signal strength can be below a signal strength threshold and the distance between the carrier and the first signal receiver can be bigger than the distance between the carrier and the second signal receiver if the carrier is on the first transport lane downstream of the intersection. As the signal strength depends on the distance between the carrier and the signal receivers, the first signal strength (S1) can be smaller than the second signal strength (S2). Accordingly, the signal strength difference (S1−S2) can be smaller than zero or the signal strength ratio (S1/S2) can be smaller than one.

In one embodiment, the first and second signal receiver can comprise a non-isotropic antenna, wherein the direction of the maximum energy transfer of at least one of the first and second signal receiver is not orthogonal to the transport lanes. In addition, the method can further comprises f) receiving, by the first signal receiver, a third signal strength of the transmitted signal after a defined time the first signal strength has been received and receiving, by the second signal receiver, a fourth signal strength of the transmitted signal after the defined time the second signal strength has been received, g) transmitting, by the first signal receiver, the third signal strength to the control unit and transmitting, by the second signal receiver, the fourth signal strength to the control unit, and h) calculating, by the control unit, the velocity and the motion direction of the carrier based on the first, second, third, and fourth signal strength.

As used herein, the term "non-isotropic antenna" can relate to a radiator, which radiates or transfers more energy in a particular direction. If the direction of the maximum energy transfer of a signal receiver is substantially orthogonal to the transport lanes, the temporal signal strength profile (signal strength over time) can be symmetric when the carrier is passing the signal receiver on the transport lane. Thus, the temporal signal strength profile can comprise a signal strength increase when the carrier is moving towards the signal receiver, a signal strength maximum signal when the carrier is in front of or at the signal receiver and a signal strength decrease when the carrier is moving away from the signal receiver. Moreover, the slope of the signal strength increase can be equal to the slope of signal strength decrease. The velocity of the carrier on the transport lane can be calculated based on signal strengths, which can correspond to a distance between the carrier and signal receivers and can be received at two different time points if the temporal signal strength profile is symmetric.

If the direction of the maximum energy transfer of a signal receiver is not orthogonal to the transport lanes, the temporal signal strength profile can be asymmetric when the carrier is passing the signal receiver on the transport lane. The slope of the signal strength increase and the slope of signal strength decrease can depend on the orientation of the direction of the maximum energy transfer of a signal receiver in relation to the motion direction of the carrier. For example, if the maximum energy transfer of a signal receiver is facing or oriented towards the motion direction of the carrier, the slope of the signal strength increase can be steeper than the slope of signal strength decrease of the temporal signal strength profile. Accordingly, in addition to the velocity, the motion direction can be calculated based on signal strengths, which can correspond to a distance between the carrier and signal receivers and can be received at two different time points. Calculating the velocity and the motion direction of the carrier may be advantageous if the transport direction of the first transport lane or the transport direction of the second transport lane can change from one direction to the opposite direction. In one embodiment, the direction of the maximum energy transfers of a signal receiver and the transport lanes can be at an angle range between 45° to 88°, possibly between 60° to 85° or between 92° to 135°, possibly between 95° to 120°.

In an alternative embodiment, the first and second signal receiver can comprise a non-isotropic antenna, wherein the direction of the maximum energy transfer of the first and second signal receiver can be substantially orthogonal to the transport lanes. In addition, the method further comprises f) receiving, by the first signal receiver, a third signal strength of the transmitted signal after a defined time the first signal strength has been received and receiving, by the second signal receiver, a fourth signal strength of the transmitted signal after the defined time the second signal strength has been received, g) transmitting, by the first signal receiver, the third signal strength to the control unit and transmitting, by the second signal receiver, the fourth signal strength to the control unit, and h) calculating, by the control unit, the velocity of the carrier based on the first, second, third, and fourth signal strength.

This embodiment may be useful if the transport direction of the first transport lane or the transport direction of the second transport lane cannot change from one direction to the opposite direction.

In one embodiment, the multi-lane transport module can further comprise a third signal receiver configured to receive the transmitted signal. The third signal receiver can be positioned at one of the lane sides or centerlines upstream or downstream of the first and second signal receiver. Additionally, the method can further comprise i) receiving, by the third signal receiver, a third signal strength of the transmitted signal before or after a defined time the first signal strength and second signal strength is received, j) transmitting, by the third signal receiver, the third signal strength to the control unit, and k) calculating, by the control unit, the velocity and motion direction of the carrier based on the first, second, and third signal strength.

The third signal receiver may be positioned at the first or second lane side of the first transport lane or at the first or second lane side of the second transport lane. Alternatively, the third signal receiver may be positioned at the centerline of the first transport lane or at the centerline of the second transport lane. The third signal receiver may be positioned upstream of the first and second signal receiver and the third signal strength can be received before a defined time the first and second signal strength can be received. Alternatively, the third signal receiver may be positioned downstream of the of the first and second signal receiver and the third signal strength can be received after a defined time the first and second signal strength has been received. Based on the distance between the third signal receiver and the first and second signal receivers, the position of the third signal receiver in relation to the first and second signal receivers, and the corresponding time points of receiving the first, second, and third signal strength, the velocity and motion direction of a carrier on a specific transport lane can be calculated.

In an alternative embodiment, the multi-lane transport module can comprise a first signal receiver and a second signal receiver, each can be configured to receive the transmitted signal. The multi-lane transport module can further comprise a sensor configured to detect the carrier and to generate a detection signal. The sensor can be positioned at one of the lane sides or centerlines upstream or downstream of the first and second signal receiver. In addition, the method can further comprise i) detecting, by the sensor, the carrier before or after a defined time the first signal strength and the second signal strength is received and generating, by the sensor, a detection signal, j) transmitting, by the sensor, the detection signal to the control unit, and k) calculating, by the control unit, the velocity and motion direction of the carrier based on the first signal strength, second signal strength, and the detection signal.

As used herein, the term "sensor" can relate to a device configured to sense or detect the carrier on the transport planes. In one embodiment, the sensor can be a light barrier configured to detect an interruption of a light beam caused by a carrier when moved on the transport planes. The interruption of a light beam can generate the detection signal, which can be transmitted to the control unit. The sensor may be positioned at the first or second lane side of the first transport lane or at the first or second lane side of the second transport lane. Alternatively, the sensor may be positioned at the centerline of the first transport lane or at the centerline of the second transport lane. The sensor may be positioned upstream of the first and second signal receiver and the detection signal can be received before a defined time the first and second signal strength can be received. Alternatively, the sensor may be positioned downstream of the of the first and second signal receiver and the detection signal can be received after a defined time the first and second signal strength has been received. Based on the distance between the sensor and the first and second signal receivers, the position of the sensor in relation to the first and second signal receivers, and the corresponding time points of receiving the first signal strength, second signal strength, and the detection signal, the velocity and motion direction of a carrier on a specific transport lane can be calculated.

In another embodiment, the multi-lane transport module can further comprise a third signal receiver configured to receive the transmitted signal and a fourth signal receiver configured to receive the transmitted signal. The first signal receiver and the third signal receiver can be positioned at the same one lane side or centerline in a defined distance to each other. The second signal receiver and the forth signal receiver can be positioned at the same another lane side or centerline in a defined distance to each other. In addition, the method can further comprise l) receiving, by the third signal receiver, a third signal strength of the transmitted signal after a defined time the first signal strength has been received and receiving, by the fourth signal receiver, a fourth signal strength of the transmitted signal after the defined time the second signal strength has been received, m) transmitting, by the third receiver, the third signal strength to the control unit and transmitting, by the fourth signal receiver, the fourth signal strength to the control unit, and n) calculating, by the control unit, the velocity and motion direction of the carrier based on the first, second, third, and fourth signal strength.

Thus, based on the distance between the first and third signal receiver, the distance between the second and fourth signal receiver, and the corresponding time points of receiving the first, second, third, and fourth signal strength, the velocity and motion direction of a carrier on a specific transport lane can be calculated. Calculating the velocity and the motion direction of the carrier may be advantageous if the transport direction of the first transport lane or the transport direction of the second transport lane can change from one direction to the opposite direction. Furthermore, such a multi-lane transport module may be more failure safe due to the redundancy of signal receivers. If one of the four signal receivers fails, the three still functioning signal receivers can still localize the carrier on a laboratory transport system and can still determine the velocity and motion direction of the carrier. For example, if the first or second signal receiver fails, the control unit can use the third signal strength and the fourth signal strength for c) to e) of the method to localize the carrier associated with the identity on one transport lane of the first and second transport lane. Additionally, the control unit can uses the third signal strength, the fourth signal strength, and the first or second signal strength for i) to k) of the method to calculate the velocity and motion direction of the carrier. If a further signal receiver fails, the two still functioning signal receivers can still localize the carrier on a laboratory transport system or can still determine the velocity and motion direction of the carrier. For example, if the first and second signal receiver fail, the control unit can use the third signal strength and the fourth signal strength for c) to e) of the method to localize the carrier associated with the identity on one transport lane of the first and second transport lane. Alternatively, if the first and fourth signal receiver fail, the control unit can use the second signal strength and the third signal strength for c) to e) of the method to localize the carrier associated with the identity on one transport lane of the first and second transport lane. Alternatively, if the first or second and third or fourth signal receiver fail, the control unit can use the second or first signal strength and the fourth or third signal strength to calculate the velocity and motion direction of the carrier.

In one embodiment, the laboratory transport system can comprise a further multi-lane transport module. The further multi-lane transport module can comprise a transport surface comprising a first and second transport lane. In addition, the multi-lane transport module and the further multi-lane transport module can be arranged adjacent to each other and configured to transport the carrier from the multi-lane transport module to the further multi-lane module on the first and second transport lanes of the multi-lane transport module and the further multi-lane transport module. The further multi-lane transport module can be communicatively connected to the control unit and the method can further comprise o) determining, by the control unit, one transport lane of the first transport lane and second transport lane of the further multi-lane transport module based on the one transport lane of the multi-lane transport module on which the carrier associated with the identity was localized and p) controlling, by the control unit, the laboratory transport system to transport the carrier from the one transport lane of the multi-lane transport module on which the carrier was localized to the one determined transport lane of the first transport lane and second transport lane of the further multi-lane transport module.

Thus, position information of the carrier associated with an identity from the multi-lane transport module can be used to determine a position on the further multi-lane transport module from where the carrier can be transported further. If the carrier and its payload is transported from a predefined starting point to a predefined destination by multiple multi-lane transport modules of the laboratory transport system, then the laboratory transport system can require position information of the carrier associated with an identity on each multi-lane transport module for a reliable transportation of the carrier. However, not all multi-lane transport modules may be equipped with means for identifying and/or localizing the carrier associated with the identity. For example, the further multi-lane transport module can comprise either no means for identifying and/or localizing the carrier or only means for identifying and/or localizing the carrier, which may not be configured to receive the transmitted signal from the carrier (e.g., a barcode reader). In particular, not all multi-lane transport modules may be equipped with such means at "handover" positions where the carrier and its payload are moving from one multi-lane transport module to another multi-lane transport module. Accordingly, o) and p) of the method may be advantageous if a laboratory transport system comprises multi-lane transport systems with no or no suitable means for identifying and/or localizing the carrier associated with an identity. This may improve the flexibility in configuring a laboratory transport system and at the same time may reduce costs of a laboratory transport system.

The number of transport lanes of the multi-lane transport module and the further multi-lane transport module may be the same or different. For example, both multi-lane transport modules may comprise two or six transport lanes. In addition, one transport lane of the multi-lane transport module may correspond to one transport lane of the further the multi-lane transport module so that carriers can always be transported from the one transport lane of the multi-lane transport module to the one transport lane of the further multi-lane transport module. Alternatively, the multi-lane transport module may comprise more transport lanes than the further multi-lane transport module. Moreover, multiple transport lanes of the multi-lane transport module may correspond to one transport lane of the further the multi-lane transport module. For example, the laboratory transport system may further comprise a merging section arranged between the multi-lane transport module and the further multi-lane transport module so that carriers from multiple transport lanes of the multi-lane transport module may be transported to one transport lane of the further multi-lane transport module.

In a further embodiment, the method can further comprise q) calculating, by the control unit, an arrival time of the carrier at the further multi-lane module based on the calculated velocity and motion direction of the carrier on the multi-lane transport module and the distance between the signal receivers of the multi-lane transport module and the further multi-lane transport module and r) controlling, by the control unit, the laboratory transport system to transport the carrier from the one transport lane of the multi-lane transport module on which the carrier was localized to the one determined transport lane of the first transport lane and second transport lane of the further multi-lane transport module based on the calculated arrival time.

Depending on the laboratory transport system, not all transport lanes of the further multi-lane transport module may be activated or operative for transporting a carrier. However, for transporting the carrier from a transport lane of the multi-lane transport module to a transport lane of the further multi-lane transport module both transport lanes may be activated or operative. Based on the calculated arrival time, the transport lane of the further multi-lane transport module can be activated on time for transporting the carrier from the multi-lane transport module to the further multi-lane transport module. As transport lanes may only be activated or operative if required for transporting a carrier, the power consumption of the laboratory transport system can be reduced.

In one embodiment, the multi-lane transport module and the further multi-lane transport module can be multi-lane transport modules of the same or different type of multi-lane transport modules. Therefore, the multi-lane transport module and further multi-lane transport module can be operatively connected to each other independent of the multi-lane transport module type.

In one embodiment, the type of multi-lane transport module can be selected from a group consisting of a multi-lane transport module comprising a number of electromagnetic actuators stationary arranged below the transport surface and configured to generate magnetic fields to move the carrier, a multi-lane transport module comprising a transport surface comprising one or more conveyor belts to move the carrier, a multi-lane transport module comprising a stable transport surface on which a self-propelled carrier can move, a multi-lane transport module comprising a transport surface comprising one or more rails on which carrier can be moved, a multi-lane transport module comprising a number of launch devices configured to impart a force on the carrier so that the carrier moves in a predefined direction for a predefined distance on the transport surface without further application of force.

The present disclosure can also relate to a laboratory transport system comprising a carrier associated with an identity, a multi-lane transport module, and a control unit. The carrier can be configured to move on the multi-lane transport module. The carrier can comprise a signal transmitter configured to transmit a signal comprising information about the identity. The multi-lane transport module can comprise a transport surface comprising a first and a second transport lane, each configured to transport the carrier. In addition, the multi-lane transport module can comprise a first signal receiver and a second signal receiver each configured to receive the transmitted signal. The multi-lane transport module can be communicatively connected to the control unit. Additionally, the laboratory transport system can be configured to execute a) to h) of the method to localize the carrier on the laboratory transport system as described herein.

In one embodiment, the first and second transport lane can be straight and substantially parallel to each other. Each of the first and second transport lane can comprise a first lane side, a second lane side, and a centerline. The first signal receiver can be positioned at one lane side and the second signal receiver can be positioned at another lane side. Alternatively, the first signal receiver can be positioned at one centerline and the second signal receiver can be positioned at the other centerline. The first signal receiver and the second signal receiver can be facing each other. In addition, the laboratory transport system can be configured to execute a) to h) of the method to localize the carrier on the laboratory transport system as described herein.

In a further embodiment, the multi-lane transport module can further comprise a third signal receiver configured to receive the transmitted signal. The third signal receiver can be positioned at one of the lane sides or centerlines upstream or downstream of the first and second signal receiver. In addition, the laboratory transport system can be configured to execute the a) to e) and i) to k) of the method as described herein.

In a further embodiment, the multi-lane transport module can further comprise a third signal receiver configured to receive the transmitted signal and a fourth signal receiver configured to receive the transmitted signal. The first signal receiver and the third signal receiver can be positioned at the same one lane side or centerline in a defined distance to each other and the second signal receiver and the forth signal receiver can be positioned at the same another lane side or centerline in a defined distance to each other, wherein the laboratory transport system can be configured to execute a) to e) and l) to n) of the method as described herein.

In one embodiment, the laboratory transport system can comprise a further multi-lane transport module. The further multi-lane transport module can comprise a transport surface comprising a first and second transport lane. The multi-lane transport module and the further multi-lane transport module can be arranged adjacent to each other and configured to transport the carrier from the multi-lane transport module to the further multi-lane module on the first and second transport lanes of the multi-lane transport module and the further multi-lane transport module. The further multi-lane transport module can be communicatively connected to the control unit and laboratory transport system can be configured to execute a) to p) of the method as described herein.

The present disclosure can further relate to a computer program product comprising instructions to cause the laboratory transport system as described herein to execute the the method to localize a carrier on the laboratory transport system as described herein.

The present disclosure can further relate to computer-readable storage medium having stored thereon the computer program comprising instructions to cause the laboratory transport system as described herein to execute the method to localize a carrier on the laboratory transport system as described herein.

Referring initially to FIG. 1, FIG. 1 depicts a schematic representation of an embodiment of a laboratory transport system (46). The laboratory transport system (46) can comprise a carrier (44) associated with an identity, a multi-lane transport module (48), and a control unit (50). The carrier (44) can be configured to move on the multi-lane transport module (48) as indicated by an arrow. The carrier (44) can comprise a signal transmitter (52) configured to transmit a signal (53) comprising information about the identity as indicated by dashed arrows. The multi-lane transport module (48) can comprise a transport surface comprising a first and a second transport lane (58, 60), each configured to transport the carrier (44). In the shown embodiment, the transport surface can comprise six transport lanes. As further, shown in FIG. 1, the multi-lane transport module (48) can comprise a first signal receiver (62) and a second signal receiver (64), each configured to receive the transmitted signal (53). The multi-lane transport module (48) may comprise more than two signal receivers (not shown). The multi-lane transport module (48) can be communicatively connected to the control unit (50). In the shown embodiment, the first and second transport lanes (58, 60) can be straight and substantially parallel to each other. Each of the first and second transport lane (58, 60) can comprise a first and second lane side (66, 68, 70, 72). Additionally, each of the first and second transport lane (58, 60) can comprise a centerline (67, 69). The first signal receiver (62) may be positioned at one lane side and the second signal receiver (64) may be positioned at another lane side. Alternatively, the first signal receiver (62) may be positioned at one centerline and the second signal receiver (64) may be positioned at the other centerline. The first signal receiver (62) and the second signal receiver (64) can be facing each other. In the shown embodiment, the first signal receiver (62) can be positioned at the first lane side (66) and the second signal receiver (64) can be positioned at the second lane side (68) of the first transport lane (58), wherein the first signal receiver (62) and the second signal receiver (64) can be facing each other.

Figure 2A:
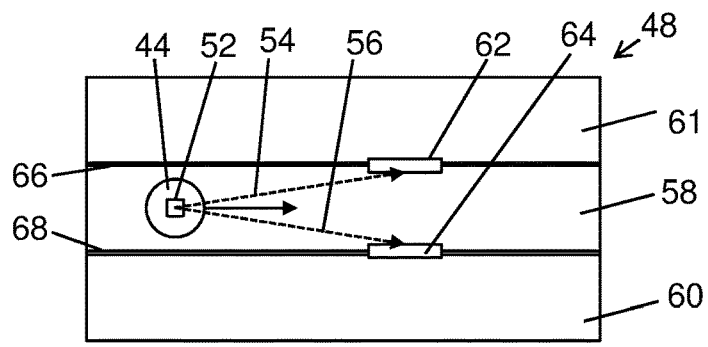
FIGS. 2A-F illustrate schematic representations of three embodiments of the multi-lane transport module and three embodiments of the method to localize a carrier on the laboratory transport system according to the present disclosure.

FIGS. 2A-F show schematic representations of three embodiments of the multi-lane transport module (48) and three embodiments of the method to localize a carrier (44) on a laboratory transport system. As shown in FIGS. 2A and B, the second lane side (68) of the first transport lane (58) can be closer to the second transport lane (60) than the first lane side (66) of the first transport lane (58). In the shown embodiment, the first signal receiver (62) can be positioned at the first lane side (66) of the first transport lane (58) and the second receiver (64) can be positioned at the second lane side (68) of the first transport lane (58). In addition, the first signal receiver (62) and the second signal receiver (64) can be facing each other. In FIG. 2A, the carrier (44) can be moving along the middle of the first transport lane (58) and the distance between the carrier (44) and the first signal receiver (62) and the distance between the carrier (44) and the second signal receiver (64) can be the same. Accordingly, the first signal strength (54) and the second signal strength (56) can be the same. Therefore, the signal strength difference (54-56) can be zero or the signal strength ratio (54/56) can be one and the control unit (50) can localize the carrier (44) on the first transport lane (58) of the multi-lane transport module (48). If the carrier (44) is not exactly in the middle of the first transport lane (58) but still within the first lane side (66) and second lane side (68) of the first transport lane (58), the signal strength difference (54-56) can be between two threshold values around 0 (e.g., 0+-X) or the signal strength ratio (54/56) can be between two threshold values around 1 (e.g., 1+Y and 1+Z) and the control unit (50) can still localize the carrier (44) on the first transport lane (58).

Figure 2B:
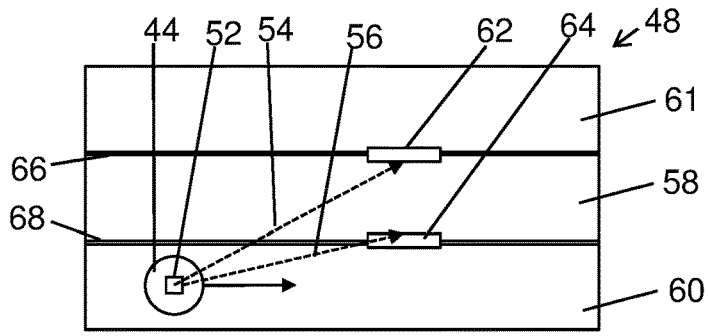

In FIG. 2B, the carrier (44) can be moving along the middle of the second transport lane (60). Thus, the carrier (44) can be moving outside the first lane side (66) and second lane side (68) of the first transport lane (58) and the distance between the carrier (44) and the first signal receiver (62) can be bigger than the distance between the carrier (44) and the second signal receiver (64). Therefore, the first signal strength (54) can be smaller than the second signal strength (56). Thus, if the signal strength difference (54-56) is below a threshold around zero (e.g., 0-X) or the signal strength ratio (54/56) is below a threshold around one (e.g., 1-Z), the control unit (50) can localize the carrier (44) on the second transport lane (60) of the multi-lane transport module (48). If the signal strength difference (54-56) is above a threshold around zero (e.g., 0+X) or the signal strength ratio (54/56) is above a threshold around one (e.g., 1+Y), the control unit (50) can localize the carrier (44) on a third transport lane (61) of the multi-lane transport module (48) which can be adjacent to the first lane side (66) of the first transport lane (58) (not shown). If additional transport lanes are arranged adjacent and substantially parallel to the second transport lane (60) and/or the third transport lane (61) as shown in FIG. 1, the control unit (50) may also locate the carrier (44) on one additional transport lane by comparing the signal strength difference (54-56) with additional threshold values around zero or by comparing the signal strength ratio (54/56) with additional threshold values around one.

Figure 2C:
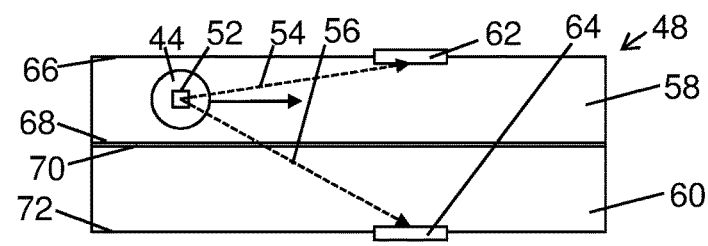
Figure 2D:
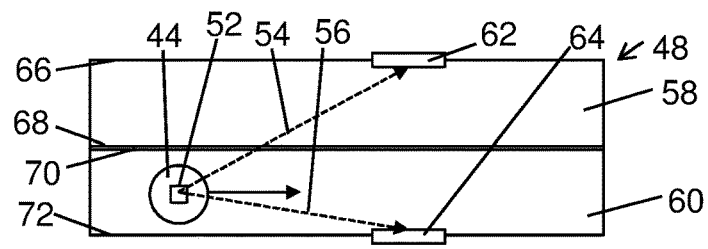

As shown in FIGS. 2C and D, the second lane side (68) of the first transport lane (58) can be closer to the second transport lane (60) than the first lane side (66) of the first transport lane (58). Moreover, the first lane side (70) of the second transport lane (60) can be closer to the first transport lane (58) than the second lane side (72) of the second transport lane (60). In the shown embodiment, the first signal receiver (62) can be positioned at the first lane side (66) of the first transport lane (58) and the second receiver (64) can be positioned at the second lane side (72) of the second transport lane (60). Additionally, the first signal receiver (62) and the second signal receiver (64) can be facing each other. As shown in FIG. 2C, the carrier (44) can be moving along the first transport lane (58). The distance between the carrier (44) and the first signal receiver (62) can be shorter than the distance between the carrier (44) and the second signal receiver (64). As the received signal strengths (54, 56) depend on the distance between the signal transmitter (53) and signal receivers (62, 64), the first signal strength (54) can be bigger than the second signal strength (56). Accordingly, the signal strength difference (54-56) can be bigger than zero or the signal strength ratio (54/56) can be bigger than one and the control unit (50) can localize the carrier (44) associated with the identity on the first transport lane (58). If the carrier (44) is on the second transport lane (60) as shown in FIG. 2D, the distance between the carrier (44) and the first signal receiver (62) can be longer than the distance between the carrier (44) and the second signal receiver (64). In addition, the first signal strength (54) can be smaller than the second signal strength (56). Accordingly, the signal strength difference (54-56) can be smaller than zero or the signal strength ratio (54/56) can be smaller than one and the control unit (50) can localize the carrier (44) on the second transport lane (60). If additional transport lanes are arranged between and substantially parallel to the first transport lane (58) and the second transport lane (60), the control unit (50) may also locate the carrier (44) on one additional transport lane by comparing the signal strength difference (54-56) with an additional threshold value or by comparing the signal strength ratio (54/56) with an additional threshold value.

Figure 2E:
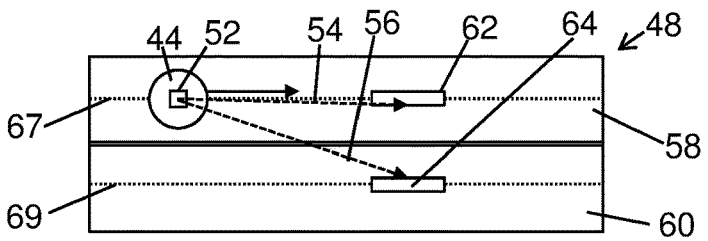
Figure 2F:
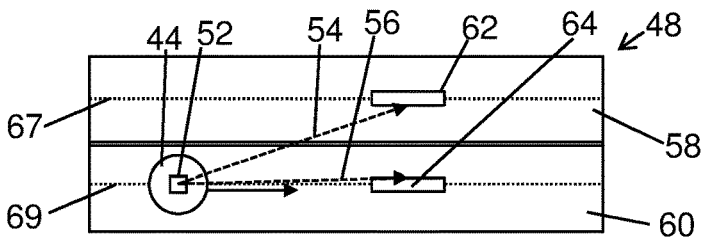

As shown in FIGS. 2E and F, the first signal receiver (62) can be positioned at the centerline (67) of the first transport lane (58) and the second signal receiver (64) can be positioned at the centerline (69) of the second transport lane (60). Moreover, the first signal receiver (62) and the second signal receiver (64) can be facing each other. As shown in FIG. 2E, the carrier (44) can be moving along the first transport lane (58) as indicated by an arrow. The distance between the carrier (44) and the first signal receiver (62) can be shorter than the distance between the carrier (44) and the second signal receiver (64). As the received signal strengths (54, 56) depend on the distance between the signal transmitter (53) and signal receivers (62, 64), the first signal strength (54) can be bigger than the second signal strength (56). Accordingly, the signal strength difference (54-56) can be bigger than zero or the signal strength ratio (54/56) can be bigger than one and the control unit (50) can localize the carrier (44) associated with the identity on the first transport lane (58). If the carrier (44) is on the second transport lane (60) as shown in FIG. 2F, the distance between the carrier (44) and the first signal receiver (62) can be longer than the distance between the carrier (44) and the second signal receiver (64). Additionally, the first signal strength (54) can be smaller than the second signal strength (56). Accordingly, the signal strength difference (54-56) can be smaller than zero or the signal strength ratio (54/56) can be smaller than one and the control unit (50) can localize the carrier (44) on the second transport lane (60). If additional transport lanes are arranged between and substantially parallel to the first transport lane (58) and the second transport lane (60), the control unit (50) may also locate the carrier (44) on one additional transport lane by comparing the signal strength difference (54-56) with an additional threshold value or by comparing the signal strength ratio (54/56) with an additional threshold value.

Figure 3A:
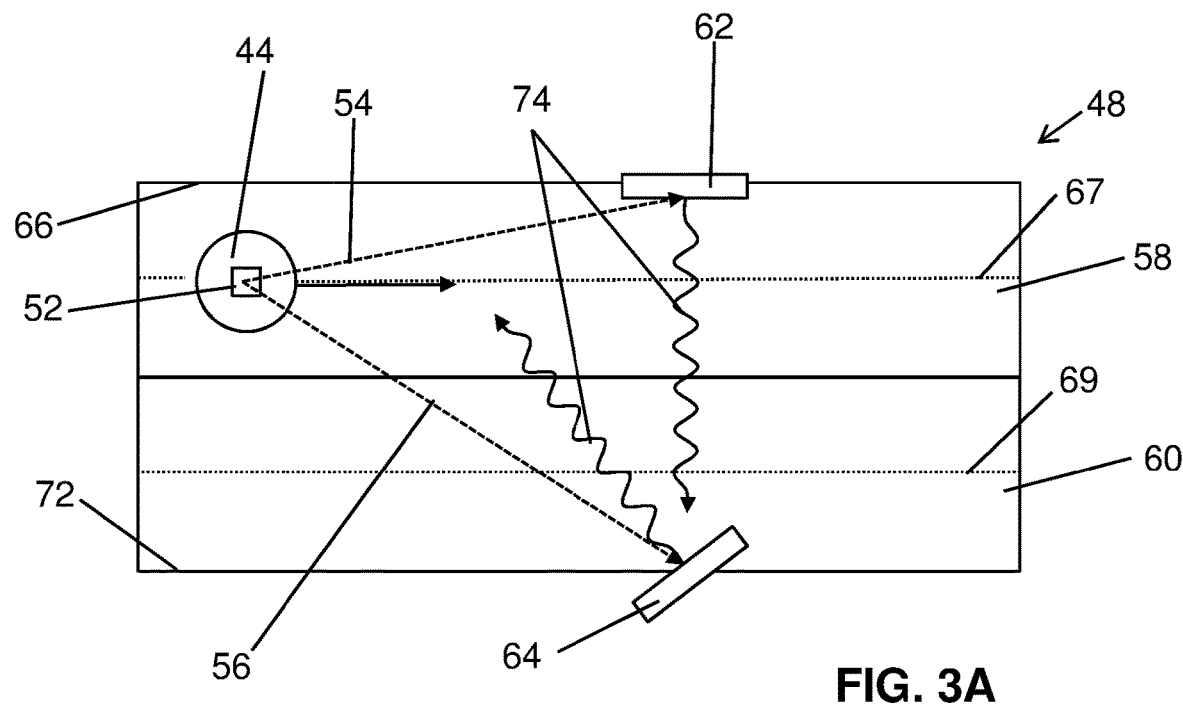
FIGS. 3A & B illustrate a further schematic representation of the multi-lane transport module and of the method to localize a carrier on a laboratory transport system and to determine the velocity and motion direction of the carrier according to an embodiment of the present disclosure.
Figure 3B:
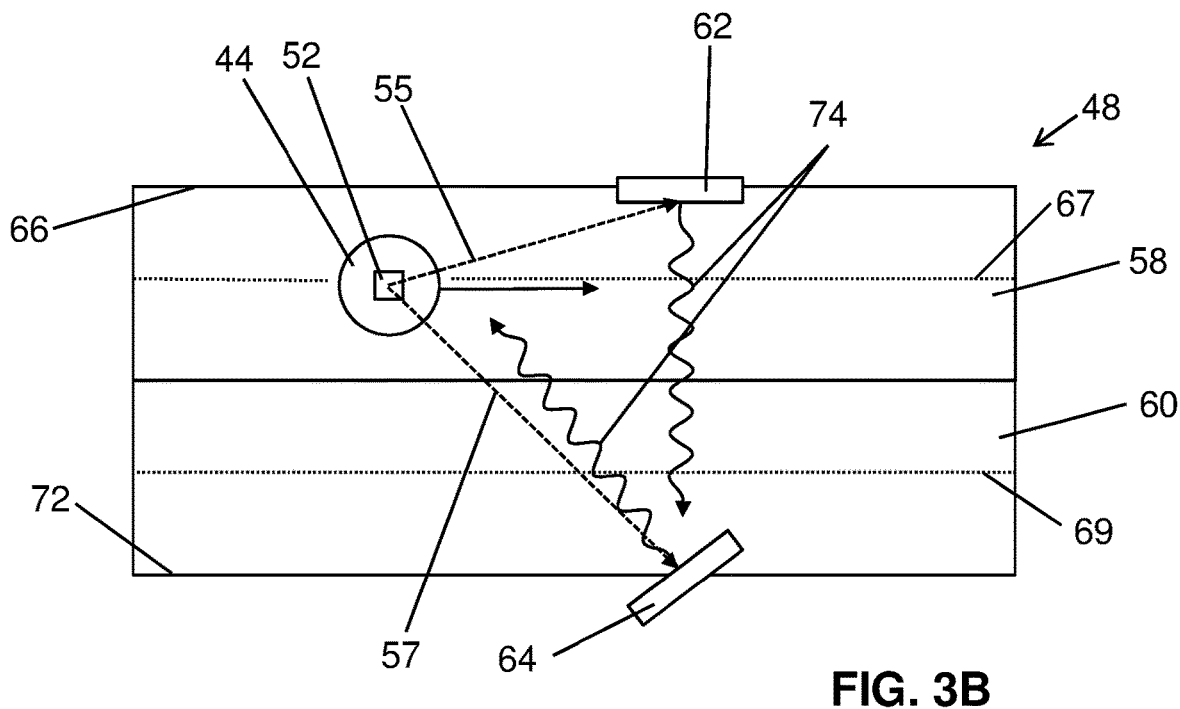

FIG. 3 depicts a further schematic representation of an embodiment of the multi-lane transport module (48) and an embodiment of the method (10) to localize a carrier (44) on a laboratory transport system (46) and to determine the velocity and motion direction of the carrier (44). The multi-lane transport module (48) can comprise a transport surface comprising a first and a second transport lane (58, 60), each configured to transport the carrier (44) as indicated by an arrow. The transport surface may comprise more than two transports lanes, e.g., six transport lanes (not shown). As shown in FIG. 3, the multi-lane transport module (48) can comprise a first signal receiver (62) and a second signal receiver (64), each configured to receive the transmitted signal (53). The shown first and second transport lanes (58, 60) can be straight and substantially parallel to each other. Each of the first and second transport lane (58, 60) can comprise a first and second lane side (66, 68, 70, 72). Each of the first and second transport lane (58, 60) can comprise a centerline (67, 69). The first signal receiver (62) may be positioned at one lane side and the second signal receiver (64) may be positioned at another lane side, wherein the first signal receiver (62) and the second signal receiver (64) can be facing each other. Alternatively, the first signal receiver (62) may be positioned at one centerline and the second signal receiver (64) may be positioned at the other centerline. In the shown embodiment, the first signal receiver (62) can be positioned at the first lane side (66) of the first transport lane (58) and the second signal receiver (64) can be positioned at the second lane side (72) of the second transport lane (60). As further shown in FIG. 3, the first and second signal receiver (62, 64) can comprise a non-isotropic antenna and each signal receiver (62, 64) can comprise a direction of maximum energy transfer (74) as indicated by wavy arrows. The direction of the maximum energy transfer (74) of at least one of the first and second signal receiver (62, 64) may not be substantially orthogonal to the transport lanes (58, 60). In the shown embodiment, the direction of the maximum energy transfer (74) of the second signal receiver (62, 64) may not be substantially orthogonal to the transport lanes (58, 60) and can be facing or oriented towards the motion direction of the carrier as indicated by an arrow. As shown in FIG. 3A, the carrier (44) can be moving along the first transport lane (58) towards the first and second signal receiver (62, 64). In addition, the first signal receiver (62) can receive a first signal strength (54) and the second signal receiver (64) can receive a second signal strength (56) at the same time. After a defined time, the first and the second signal strength (54, 56) have been received, the first signal receiver (62) can receive a third signal strength (55) and the second signal receiver can receive a fourth signal strength (57) of the transmitted signal (53) at the same time as shown in FIG. 3B. Afterwards, the control unit (50) can localize the carrier (44) on the first transport lane (58) as described in FIGS. 2C and D and can calculate the velocity and the motion direction of the carrier (44) based on the first, second, third, and fourth signal strength (54, 56, 55, 57).

FIG. 4 shows a schematic representation of a further embodiment of the multi-lane transport module (48) and a further embodiment of the method (10) to localize a carrier (44) on a laboratory transport system (46) and to determine the velocity and motion direction of the carrier (44). The multi-lane transport module (48) can comprise a transport surface comprising a first and a second transport lane (58, 60), each configured to transport the carrier (44) as indicated by an arrow. The transport surface may comprise more than two transports lanes, e.g., six transport lanes (not shown). As shown in FIG. 4, the multi-lane transport module (48) can comprise a first signal receiver (62), a second signal receiver (64), and a third signal receiver (82), each configured to receive the transmitted signal from the carrier (44). The shown first and second transport lanes (58, 60) can be straight and substantially parallel to each other. Each of the first and second transport lane (58, 60) can comprise a first and second lane side (66, 68, 70, 72). Each of the first and second transport lane (58, 60) can comprise a centerline (67, 69). The first signal receiver (62) may be positioned at one lane side and the second signal receiver (64) can be positioned at another lane side. Alternatively, the first signal receiver (62) may positioned at one centerline and the second signal receiver (64) may be positioned at the other centerline. In the shown embodiment, the first signal receiver (62) can be positioned at the first lane side (66) of the first transport lane (58) and the second signal receiver (64) can be positioned at the second lane side (72) of the second transport lane (60). The first signal receiver (62) and the second signal receiver (64) can be facing each other. The third signal receiver (82) may be positioned at one of the lane sides (66, 68, 70, 72) or centerlines (67, 69) upstream or downstream of the first and second signal receiver (62, 64). In the shown embodiment, the third signal receiver (82) can be positioned at the second line side (68) of the first transport lane (58) and upstream of the first and second signal receiver (62, 64).

Figure 4A:
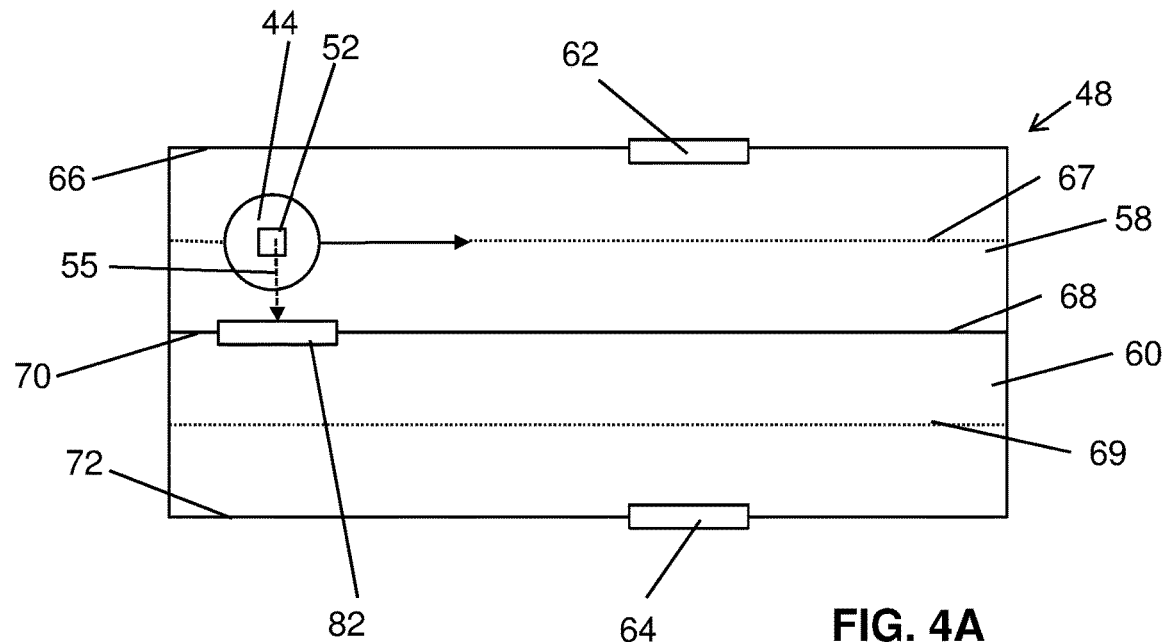
FIGS. 4A & B illustrate a schematic representation of the multi-lane transport module and of the method to localize a carrier on a laboratory transport system and to determine the velocity and motion direction of the carrier according to another embodiment of the present disclosure.
Figure 4B:
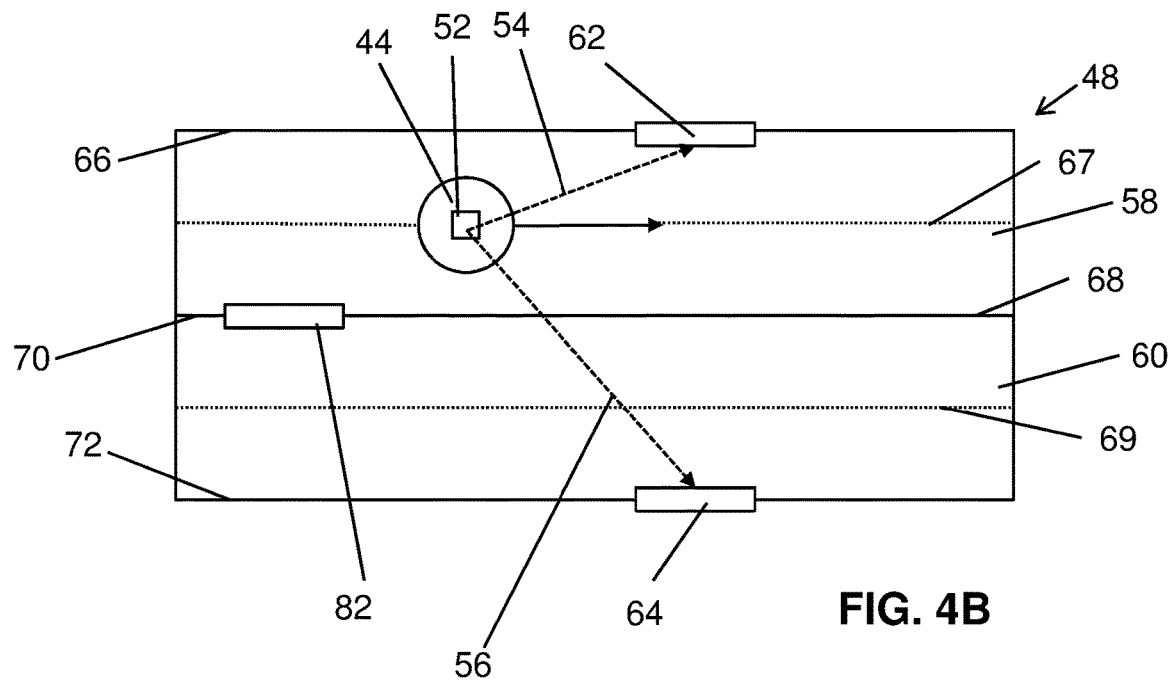

As shown in FIG. 4A, the carrier (44) can be moving along the first transport lane (58) towards the first and second signal receiver (62, 64) as indicated by an arrow. Moreover, the third signal receiver (82) can receive a third signal strength (55). After a defined time, the third signal strength (55) has been received by the third signal receiver (82), the first signal receiver (62) can receive a first signal strength (54) and the second signal receiver (64) can receive a second signal strength (56) at the same time as shown in FIG. 4B. Afterwards, the control unit (50) can localize the carrier (44) on the first transport lane (58) as described in FIGS. 2C and D and can calculate the velocity and the motion direction of the carrier (44) based on the first, second, and third signal strength (54, 56, 55). Alternatively, the third signal receiver (82) may be positioned downstream of the first and second signal receiver (62, 64) and the third signal strength (55) may be received after a defined time the first signal strength (54) and the second signal strength (56) have been received by the first signal receiver (62) and second signal receiver (64).

Figure 5A:
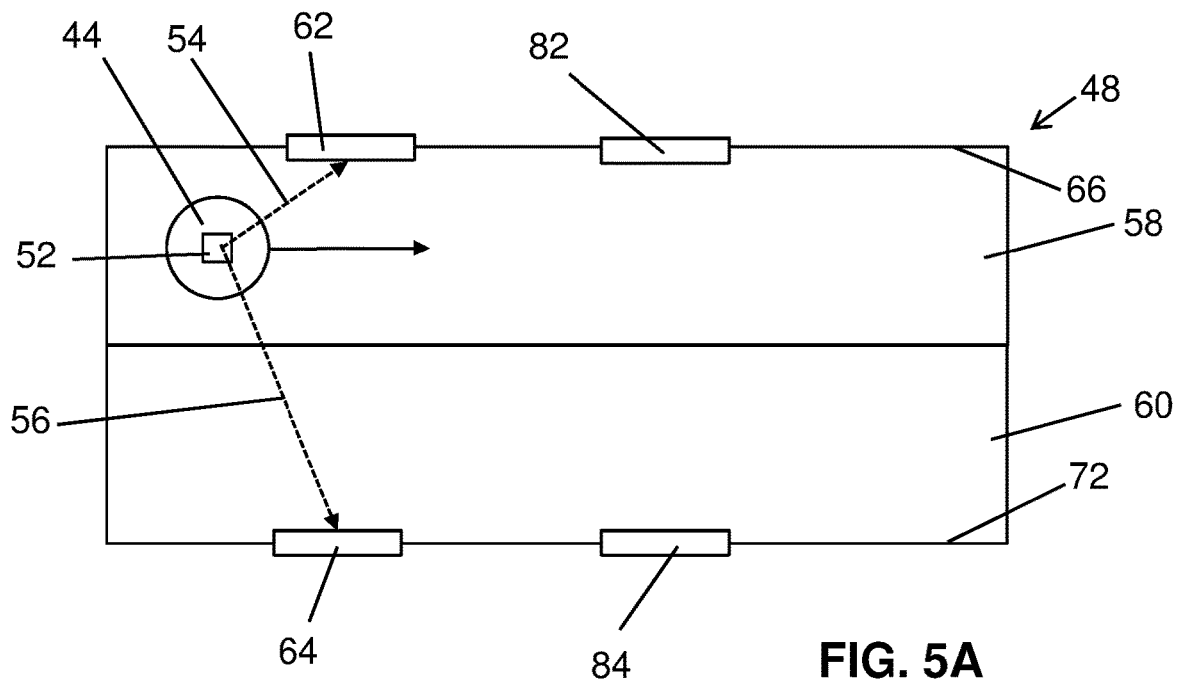
FIGS. 5A & B illustrate a schematic representation of the multi-lane transport module and of the method to localize a carrier on a laboratory transport system and to determine the velocity and motion direction of the carrier according to yet another embodiment of the present disclosure.

FIG. 5 shows a schematic representation of a further embodiment of the multi-lane transport module (48) and a further embodiment of the method (10) to localize a carrier (44) on a laboratory transport system (46) and to determine the velocity and motion direction of the carrier (44). The multi-lane transport module (48) can comprise a transport surface comprising a first and a second transport lane (58, 60), each configured to transport the carrier (44) as indicated by an arrow. The transport surface may comprise more than two transports lanes, e.g., six transport lanes (not shown). As shown in FIG. 5A, the multi-lane transport module can comprise a first signal receiver (62), a second signal receiver (64), a third signal receiver (82), and a fourth signal receiver (82), each configured to receive the transmitted signal from the carrier (44). The first signal receiver (62) and the third signal receiver (82) may be positioned at the same one lane side or centerline (not shown) in a defined distance to each other and the second signal receiver (64) and the forth signal receiver (84) may be positioned at the same another lane side or centerline (not shown) in the defined distance to each other. The first signal receiver (62) and the second signal receiver (64) can be facing each other and the third signal receiver (82) and the fourth signal receiver (84) can be facing each other. In the shown embodiment, the first signal receiver (62) and the third signal receiver (82) can be positioned at the first lane side (66) of the first transport lane (58) and the second signal receiver (64) and the fourth signal receiver (84) can be positioned at the second lane side (72) of the second transport lane (60).

Figure 5B:
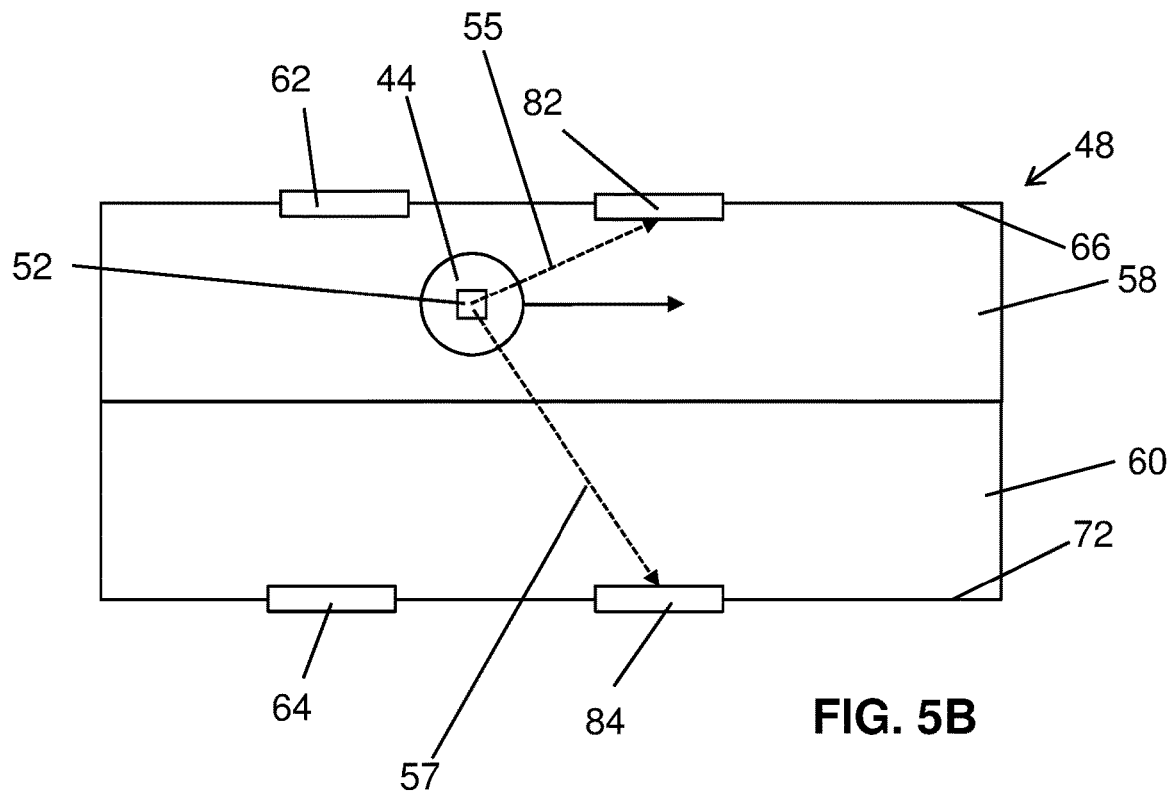

As shown in FIG. 5A, the carrier (44) can be moving along the first transport lane (58) towards the first and second signal receiver (62, 64). The first signal receiver (62) can receive a first signal strength (54) and the second signal receiver (64) can receive a second signal strength (56) at the same time. After a defined time, the first signal strength (54) and the second signal strength (56) have been received, the third signal receiver (82) can receive a third signal strength (55) and the fourth signal receiver (84) can receive a fourth signal strength (57) at the same time as shown in FIG. 5B. Afterwards, the control unit (50) can localize the carrier (44) on the first transport lane (58) as described in FIGS. 2C and D and can calculate the velocity and the motion direction of the carrier (44) based on the first, second, third, and fourth signal strength (54, 55, 56, 57).

Figure 6:
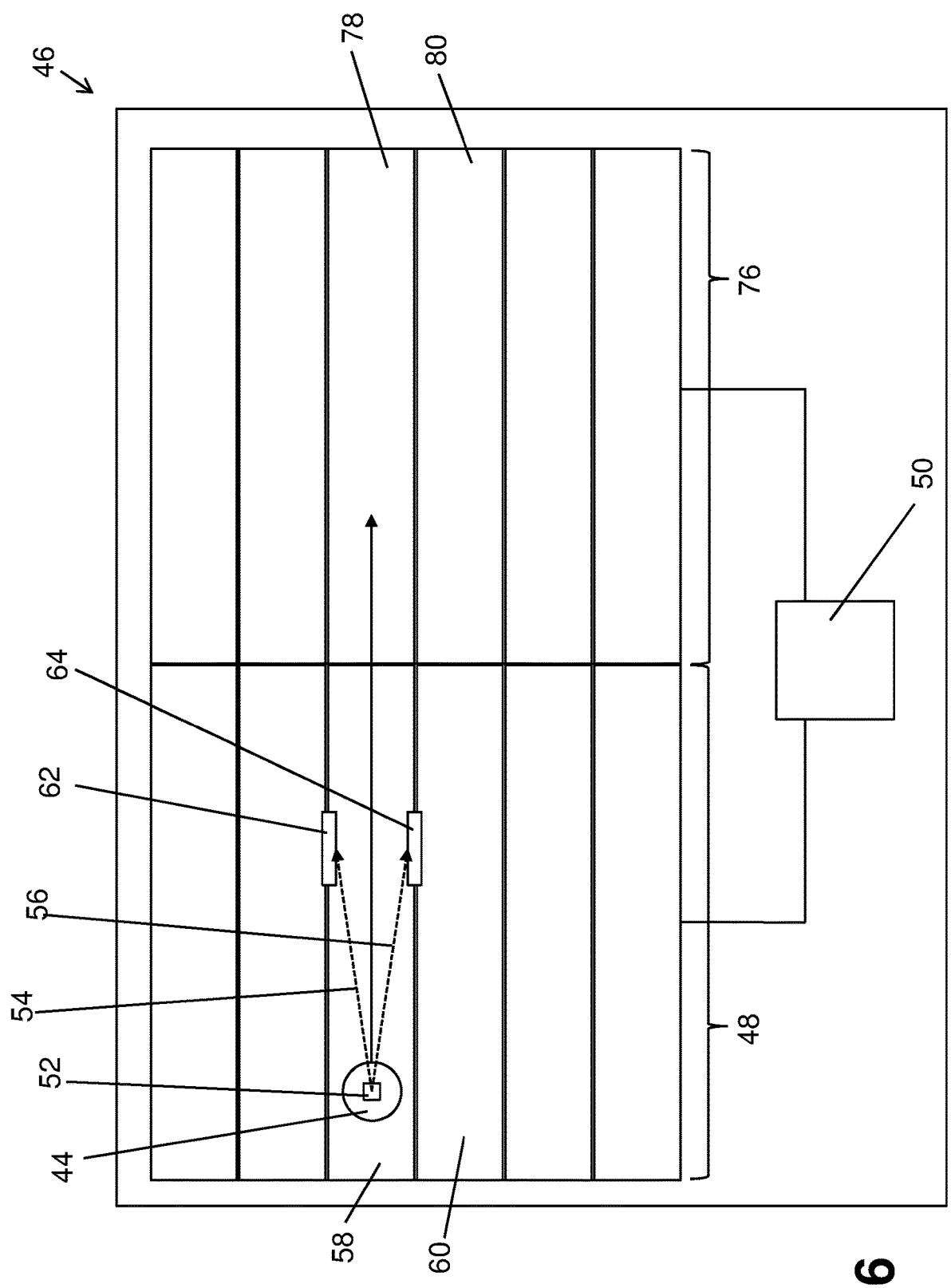
FIG. 6 illustrates a schematic representation of the laboratory transport system and of the method to localize a carrier on a laboratory transport system according to still yet another embodiment of the present disclosure.

In FIG. 6, a schematic representation of another embodiment of the laboratory transport system (46) and a further embodiment of the method (10) to localize a carrier (44) on the laboratory transport system (46) is shown. The laboratory transport system (46) can comprise a carrier (44) associated with an identity, a multi-lane transport module (48), and a control unit (50) as shown in FIG. 1. In addition, the laboratory transport system (46) can comprise a further multi-lane transport module (76). The further multi-lane transport module (76) can comprise a transport surface comprising a first and second transport lane (78, 80). In the shown embodiment, the transport surface can comprise six transport lanes. As shown in FIG. 6, the multi-lane transport module (48) and the further multi-lane transport module (76) can be arranged adjacent to each other and configured to transport the carrier (44) from the multi-lane transport module (48) to the further multi-lane module (76) on the first and second transport lanes (58, 60, 78, 80) of the multi-lane transport module (48) and the further multi-lane transport module (76) as indicated by an arrow. In addition, the multi-lane transport module (48) and the further multi-lane transport module (76) can be communicatively connected to the control unit (50).

The carrier (44) associated with the identity can be localized on the multi-lane transport module (48) as described in FIGS. 2A and B. In the shown example, the carrier (44) can be localized on the first transport lane (58). Then, the control unit (50) can determine the first transport lane (78) of the further multi-lane transport module (76) based on the first transport lane (58) of the multi-lane transport module (48) on which the carrier (44) associated with the identity was localized. Subsequently, the control unit (50) can control the laboratory transport system (46) to transport the carrier (44) from the first transport lane (58) of the multi-lane transport module (48) to the first transport lane (78) of the further multi-lane transport module (76).

FIG. 7A-E show flowcharts of embodiments of the method (10) to localize a carrier (44) on a laboratory transport system (46) and embodiments of the method (10) to localize a carrier (44) on a laboratory transport system (46) and to determine the velocity and motion direction of the carrier (44). FIG. 7A shows a first embodiment of the method (10) if the laboratory transport system (46) comprises a carrier (44) associated with an identity, a multi-lane transport module (48), and a control unit (50) as described in FIG. 1 and FIG. 2. In step a) (12) of the method (10), the first signal receiver (62) can receive a first signal strength (54) of the transmitted signal (53) and the second signal receiver (64) can receive a second signal strength (56) of the transmitted signal (53) at the same time. Then, the first signal receiver (62) can transmit the first signal strength (54) to the control unit (50) and the second signal receiver (64) can transmit the second signal strength (56) to the control unit (50) in step b) (14) of the method (10). Subsequently, the control unit (50) can calculate a signal strength difference or signal strength ratio based on the first signal strength (54) and second signal strength (56) in in step c) (16) of the method (10). In step d) (18) of the method (10), the control unit (50) can compare the calculated signal strength difference or signal strength ratio with one or more threshold values. Finally, the control unit (50) can localize in step e) (20) of the method (10) the carrier (44) associated with the identity on one transport lane of the first and second transport lane (58, 60) based on the comparison between the calculated signal strength difference or signal strength ratio and the one or more threshold values.

FIG. 7B shows a second embodiment of the method (10) if the first and second signal receiver (62, 64) comprise a non-isotropic antenna, wherein the direction of the maximum energy transfer (74) of at least one of the first and second signal receiver (62, 64) is not orthogonal to the transport lanes (58, 60) as shown in FIG. 3. In the second embodiment of the method (10), in addition to localizing the carrier (44) associated with the identity on one transport lane of the first and second transport lane (58, 60) based on method steps a) to e) (12, 14, 16, 18, 20) also the velocity and the motion direction of the carrier (44) can be calculated. After step a) (12) of the method (10), in step f) (22) of the method (10), the first signal receiver (62) can receive a third signal strength (55) of the transmitted signal (53) after a defined time the first signal strength (54) has been received and the second signal receiver (64) can receive a fourth signal strength (57) of the transmitted signal (53) after the defined time the second signal strength (56) has been received. After step f) (22) of the method (10), the first signal receiver (62) can transmit the third signal strength (55) to the control unit (50) and the second signal receiver (64) can transmit the fourth signal strength (57) to the control unit (50) in step g) (24) of the method (10). Finally, the control unit (50) can calculate the velocity and the motion direction of the carrier (44) based on the first, second, third, and fourth signal strength (54, 56, 55, 57) in step h) (26) of the method (10).

FIG. 7C shows a third embodiment of the method (10) if the multi-lane transport module (48) comprises a first signal receiver (62), a second signal receiver (64), and a third signal receiver (82), each configured to receive the transmitted signal (53) as shown in FIG. 4. In the third embodiment of the method (10), in addition to localizing the carrier (44) associated with the identity on one transport lane of the first and second transport lane (58, 60) based on method steps a) to e) (12, 14, 16, 18, 20), the velocity and the motion direction of the carrier (44) can also be calculated. If the third signal receiver (82) is positioned at one of the lane sides or centerlines upstream of the first and second signal receiver (62, 64), the third signal receiver (82) can receive a third signal strength (55) of the transmitted signal (53) in step i) (28) of the method (10) before a defined time the first signal strength (54) and second signal strength (56) are received in step a) (12) of the method (10). Alternatively, the third signal receiver (82) may be positioned at one of the lane sides or centerlines downstream of the first and second signal receiver (62, 64) and the third signal receiver (82) may receive a third signal strength (55) of the transmitted signal (53) in step i) (28) after a defined time the first signal strength (54) and second signal strength (56) have been received in step a) (12) of the method (10) (not shown). The third signal receiver (82) can transmit the third signal strength (55) to the control unit (50) in step j) (30) of the method (10). Subsequently, the control unit (50) can calculate the velocity and motion direction of the carrier (44) based on the first, second, and third signal strength (54, 56, 55) in step k) (32) of the method (10).

FIG. 7D shows a fourth embodiment of the method (10) if the multi-lane transport module (48) comprises a first signal receiver (62), a second signal receiver (64), a third signal receiver (82), and a fourth signal receiver (84), each configured to receive the transmitted signal (53) as shown in FIG. 5. In the fourth embodiment of the method (10), in addition to localizing the carrier (44) associated with the identity on one transport lane of the first and second transport lane (58, 60) based on method steps a) to e) (12, 14, 16, 18, 20), the velocity and the motion direction of the carrier (44) can also be calculated. After step a) of the method (10), the third signal receiver (82) can receive a third signal strength (55) of the transmitted signal (53) after a defined time the first signal strength (54) has been received by the first signal receiver (62) and the fourth signal receiver (84) can receive a fourth signal strength (57) of the transmitted signal (53) after the defined time the second signal strength (56) has been received by the second signal receiver (64) in step l) (34) of the method (10). Then, in step m) (36) of the method (10), the third signal receiver (82) can transmit the third signal strength (55) to the control unit (50) and the fourth signal receiver (84) can transmit the fourth signal strength (57) to the control unit (50). Finally, the control unit (50) can calculate the velocity and motion direction of the carrier (44) based on the first, second, third, and fourth signal strength in step n) (38) of the method (10).

FIG. 7E shows a fifth embodiment of the method (10) if the laboratory transport system (46) comprises a further multi-lane transport module (76) as shown in FIG. 6. Steps a) to e) (12, 14, 16, 18, 20) of the fifth embodiment of the method (10) are the same as steps a) to e) (12, 14, 16, 18, 20) of the first embodiment of the method (10) as described in FIG. 7A. After step e) (20) of the method (10), the control unit (50) can determine in step o) (40) of the method (10), one transport lane of the first transport lane (78) and second transport lane (80) of the further multi-lane transport module (76) based on the one transport lane (58, 60) of the multi-lane transport module (48) on which the carrier (44) associated with the identity was localized. Afterwards, the control unit (50) can control in step p) (42) of the method (10) the laboratory transport system (46) to transport the carrier (44) from the one transport lane (58, 60) of the multi-lane transport module (48) on which the carrier (44) was localized to the one determined transport lane of the first transport lane (78) and second transport lane (80) of the further multi-lane transport module (76).

In the preceding specification and figures, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the invention may be practiced otherwise than as specifically devised in the above examples.

Reference throughout the preceding specification to "one embodiment", "an embodiment", "one example" or "an example", can mean that a particular feature, structure or characteristic described in connection with the embodiment or example can be included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A method to localize a carrier moving on a laboratory transport system, the laboratory transport system comprising a carrier associated with an identity, a multi-lane transport module, and a control unit, wherein the carrier comprises a signal transmitter transmitting a signal comprising information about the identity, wherein the multi-lane transport module comprises a transport surface comprising first and second transport lanes, one of the first and second transport lanes transporting the carrier, wherein the multi-lane transport module comprises a first signal receiver and a second signal receiver, each signal receiver receiving the transmitted signal, wherein the multi-lane transport module is communicatively connected to the control unit, wherein the method comprising:
    a) receiving, by the first signal receiver, a first signal strength of the transmitted signal and receiving, by the second signal receiver, a second signal strength of the transmitted signal at the same time;
    b) transmitting, by the first signal receiver, the first signal strength to the control unit and transmitting, by the second signal receiver, the second signal strength to the control unit;
    c) calculating, by the control unit, a signal strength difference or signal strength ratio based on the first signal strength and second signal strength;
    d) comparing, by the control unit, the calculated signal strength difference or signal strength ratio with one or more threshold values; and
    e) localizing, by the control unit, the carrier associated with the identity on one transport lane of the first and second transport lanes based on the comparison between the calculated signal strength difference or signal strength ratio and the one or more threshold values.

2. The method according to claim 1, wherein the first and second transport lanes are straight and parallel to each other, wherein each of the first and second transport lanes comprises a first lane side, a second lane side, and a centerline, wherein the first signal receiver is positioned at one lane side and the second signal receiver is positioned at another lane side or the first signal receiver is positioned at one centerline and the second signal receiver is positioned at the other centerline, wherein the first signal receiver and the second signal receiver are facing each other.

3. The method according to claim 2, wherein the second lane side of the first transport lane is closer to the second transport lane than the first lane side of the first transport lane, wherein the first signal receiver is positioned at the first lane side of the first transport lane and the second receiver is positioned at the second lane side of the first transport lane, wherein in e) the carrier associated with the identity is localized on the first transport lane if the signal strength difference or signal strength ratio is between two threshold values.

4. The method according to claim 2, wherein the second lane side of the first transport lane is closer to the second transport lane than the first lane side of the first transport lane, wherein the first lane side of the second transport lane is closer to the first transport lane than the second lane side of the second transport lane, wherein the first signal receiver is positioned at the first lane side of the first transport lane and the second receiver is positioned at the second lane side of the second transport lane, wherein in e) the carrier associated with the identity is localized on the first transport lane if the signal strength difference or signal strength ratio is bigger than one threshold value.

5. The method according to claim 2, wherein the first signal receiver is positioned at the centerline of the first transport lane and the second signal receiver is positioned at the centerline of the second transport lane, wherein in e) the carrier associated with the identity is localized on the first transport lane if the signal strength difference or signal strength ratio is bigger than one threshold value.

6. The method according to claim 1, wherein the first and second signal receivers comprise a non-isotropic antenna, wherein the direction of the maximum energy transfer of at least one of the first and second signal receivers is not orthogonal to the transport lanes, and further comprising, f) receiving, by the first signal receiver, a third signal strength of the transmitted signal after a defined time the first signal strength has been received and receiving, by the second signal receiver, a fourth signal strength of the transmitted signal after the defined time the second signal strength has been received;

g) transmitting, by the first signal receiver, the third signal strength to the control unit and transmitting, by the second signal receiver, the fourth signal strength to the control unit; and h) calculating, by the control unit, the velocity and the motion direction of the carrier based on the first, second, third, and fourth signal strengths.

7. The method according to claim 2, wherein the multi-lane transport module further comprises a third signal receiver receiving the transmitted signal, wherein the third signal receiver is positioned at one of the lane sides or centerlines upstream or downstream of the first and second signal receiver, further comprises, i) receiving, by the third signal receiver, a third signal strength of the transmitted signal before or after a defined time the first signal strength and the second signal strength is received;

j) transmitting, by the third signal receiver, the third signal strength to the control unit; and k) calculating, by the control unit, the velocity and motion direction of the carrier based on the first, second, and third signal strength.

8. The method according to claim 2, wherein the multi-lane transport module further comprises a third signal receiver receiving the transmitted signal and a fourth signal receiver receiving the transmitted signal, wherein the first signal receiver and the third signal receiver are positioned at the same one lane side or centerline in a defined distance to each other, wherein the second signal receiver and the forth signal receiver are positioned at the same another lane side or centerline in a defined distance to each other, further comprises, l) receiving, by the third signal receiver, a third signal strength of the transmitted signal after a defined time the first signal strength has been received and receiving, by the fourth signal receiver, a fourth signal strength of the transmitted signal after the defined time the second signal strength has been received;

m) transmitting, by the third receiver, the third signal strength to the control unit and transmitting, by the fourth signal receiver, the fourth signal strength to the control unit; and n) calculating, by the control unit, the velocity and motion direction of the carrier based on the first, second, third, and fourth signal strength.

9. The method according to claim 1, wherein the laboratory transport system comprises a further multi-lane transport module, wherein the further multi-lane transport module comprises a transport surface comprising a first and second transport lane, wherein the multi-lane transport module and the further multi-lane transport module are arranged adjacent to each other and transporting the carrier from the multi-lane transport module to the further multi-lane module on the first and second transport lanes of the multi-lane transport module and the further multi-lane transport module, wherein the further multi-lane transport module is communicatively connected to the control unit, further comprises, o) determining, by the control unit, one transport lane of the first transport lane and second transport lane of the further multi-lane transport module based on the one transport lane of the multi-lane transport module on which the carrier associated with the identity was localized; and p) controlling, by the control unit, the laboratory transport system to transport the carrier from the one transport lane of the multi-lane transport module on which the carrier was localized to the one determined transport lane of the first transport lane and second transport lane of the further multi-lane transport module.

10. The method according to claim 9, wherein the multi-lane transport module and the further multi-lane transport module are multi-lane transport modules of the same or different type of multi-lane transport modules.

11. The method according to claim 1, wherein the method further comprises the following after b):

comparing, by the control unit, the transmitted first signal strength with a first predefined signal strength threshold and comparing, by the control unit, the transmitted second signal strength with a second predefined signal strength threshold;

executing c) to e) of the method, by the control unit, if the first signal strength is above the first signal strength threshold and the second signal strength is above the second signal strength threshold; or controlling, by the control unit, the laboratory transport system to transport subsequent carriers which enter the multi-lane transport module on a predefined transport lane of the first and second transport lane if the first signal strength is below the first signal strength threshold or the second signal strength is below the second signal strength threshold.

12. A laboratory transport system, the laboratory transport system comprising:

a carrier associated with an identity;

a multi-lane transport module; and a control unit, wherein the carrier is moves moving on the multi-lane transport module, wherein the carrier comprises a signal transmitter transmitting a signal comprising information about the identity, wherein the multi-lane transport module comprises first and second transport lanes, transporting the carrier, wherein the multi-lane transport module comprises a first signal receiver and a second signal receiver, each signal receiver receiving the transmitted signal, wherein the multi-lane transport module is communicatively connected to the control unit, and wherein the laboratory transport system executes the method according to claim 1.

13. The laboratory transport system according to claim 12, wherein the first and second transport lanes are straight and parallel to each other, wherein each of the first and second transport lanes comprises a first lane side, a second lane side, and a centerline, wherein the first signal receiver is positioned at one lane side and the second signal receiver is positioned at another lane side or the first signal receiver is positioned at one centerline and the second signal receiver is positioned at the other centerline, wherein the first signal receiver and the second signal receiver are facing each other.

14. The laboratory transport system according to claim 13, wherein the multi-lane transport module further comprises a third signal receiver receiving the transmitted signal, wherein the third signal receiver is positioned at one of the lane sides or centerlines upstream or downstream of the first and second signal receiver.

15. The laboratory transport system according to claim 13, wherein the multi-lane transport module further comprises a third signal receiver receiving the transmitted signal and a fourth signal receiver receiving the transmitted signal, wherein the first signal receiver and the third signal receiver are positioned at the same one lane side or centerline in a defined distance to each other, and wherein the second signal receiver and the forth signal receiver are positioned at the same another lane side or centerline in a defined distance to each other.

16. The laboratory transport system according to claim 12, wherein the laboratory transport system comprises a further multi-lane transport module, wherein the further multi-lane transport module comprises a transport surface comprising first and second transport lanes, wherein the multi-lane transport module and the further multi-lane transport module are arranged adjacent to each other and transporting the carrier from the multi-lane transport module to the further multi-lane module on either of the first and second transport lanes of the multi-lane transport module and the further multi-lane transport module, wherein the further multi-lane transport module is communicatively connected to the control unit.

17. A method to localize a carrier moving on a laboratory transport system, the laboratory transport system comprising a transport surface comprising first and second transport lanes, one of the first and second transport lanes transporting the carrier, the carrier comprising a signal transmitter, the method comprising:
- transmitting by the signal transmitter a signal comprising information about the carrier identity;
- receiving by a first signal receiver and by a second signal receiver, the signal transmitted by the carrier, the signal received by the first signal receiver having a first signal strength of the transmitted signal, and the signal received by the second signal receiver having a second signal strength;
- transmitting, by the first signal receiver, the first signal strength to a control unit and transmitting, by the second signal receiver, the second signal strength to the control unit;
- calculating, by the control unit, a signal strength difference or signal strength ratio based on the first signal strength and second signal strength;
- comparing, by the control unit, the calculated signal strength difference or signal strength ratio with one or more threshold values; and
- localizing, by the control unit, the carrier associated with the identity on one transport lane of the first and second transport lanes based on the comparison between the calculated signal strength difference or signal strength ratio and the one or more threshold values.

* * * * *